(12) United States Patent
Al-Mayahi et al.

(10) Patent No.: US 8,221,629 B2
(45) Date of Patent: *Jul. 17, 2012

(54) SOLVENT REMOVAL PROCESS

(75) Inventors: Abdulsalam Al-Mayahi, Worcester Park (GB); Adel Sharif, Guildford (GB)

(73) Assignee: Surrey Aquatechnology Limited, Surrey (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/012,609

(22) Filed: Jan. 24, 2011

(65) Prior Publication Data

US 2011/0114558 A1 May 19, 2011

Related U.S. Application Data

(63) Continuation of application No. 10/566,389, filed as application No. PCT/GB2004/003242 on Jul. 28, 2004, now Pat. No. 7,879,243.

(30) Foreign Application Priority Data

Jul. 30, 2003 (GB) .................................. 0317839.9

(51) Int. Cl.
*B01D 61/00* (2006.01)
*B01D 11/00* (2006.01)
*C02F 1/44* (2006.01)

(52) U.S. Cl. ........ 210/652; 210/641; 210/639; 210/644; 210/649

(58) Field of Classification Search .................. 210/644, 210/652, 639, 636, 649, 641
See application file for complete search history.

(56) References Cited

U.S. PATENT DOCUMENTS

| 3,532,621 | A | | 10/1970 | Hough | |
|---|---|---|---|---|---|
| 3,760,805 | A | * | 9/1973 | Higuchi | 604/892.1 |
| 3,906,250 | A | * | 9/1975 | Loeb | 290/1 R |
| 3,978,344 | A | * | 8/1976 | Jellinek | 290/1 R |
| 4,034,756 | A | * | 7/1977 | Higuchi et al. | 604/892.1 |
| 4,340,054 | A | * | 7/1982 | Michaels | 604/892.1 |
| 4,781,837 | A | * | 11/1988 | Lefebvre | 210/640 |
| 4,828,706 | A | * | 5/1989 | Eddleman | 210/644 |
| 4,879,030 | A | * | 11/1989 | Stache | 210/238 |
| 4,920,105 | A | * | 4/1990 | Zelman | 514/59 |
| 4,960,521 | A | * | 10/1990 | Keller | 210/644 |
| 5,098,575 | A | * | 3/1992 | Yaeli | 210/652 |
| 5,281,430 | A | | 1/1994 | Herron et al. | |
| 5,324,428 | A | * | 6/1994 | Flaherty | 210/232 |
| 5,474,785 | A | * | 12/1995 | Wright et al. | 424/473 |
| 5,755,964 | A | * | 5/1998 | Mickols | 210/500.37 |
| 6,056,878 | A | * | 5/2000 | Tessier et al. | 210/639 |
| 6,180,056 | B1 | * | 1/2001 | McNeel et al. | 422/15 |
| 6,391,205 | B1 | | 5/2002 | McGinnis | |
| 6,508,936 | B1 | | 1/2003 | Hassan | |

(Continued)

FOREIGN PATENT DOCUMENTS

WO 9718166 5/1997

(Continued)

*Primary Examiner* — Ana Fortuna
(74) *Attorney, Agent, or Firm* — Whyte Hirschboeck Dudek S.C.

(57) ABSTRACT

A process for removing a solvent from a first solution, said process comprising positioning a selective membrane between the first solution and a second solution having a higher osmotic potential than the first solution, such that solvent from the first solution passes across the membrane to dilute the second solution, and extracting solvent from the second solution, wherein the membrane has an average pore size of at least 10 Angstroms, and wherein the second solution contains solute species that are too large to pass through the pores of the membrane.

17 Claims, 6 Drawing Sheets

U.S. PATENT DOCUMENTS

Figure 1:
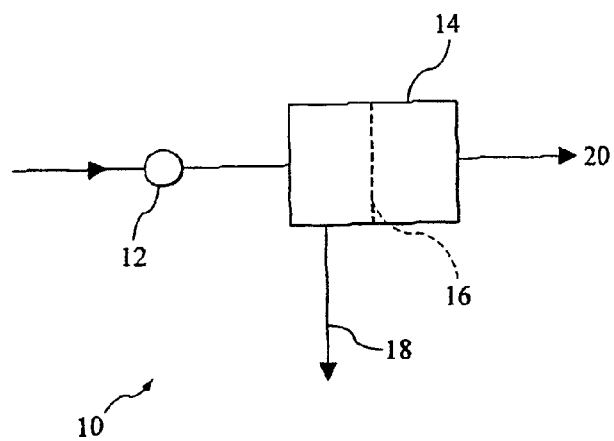

| | | | |
|---|---|---|---|
| 7,618,538 B2 * | 11/2009 | Palacios Donaque et al. | 210/652 |
| 7,727,400 B2 * | 6/2010 | Flynn | 210/652 |
| 7,789,243 B2 * | 9/2010 | Hornung et al. | 209/534 |

FOREIGN PATENT DOCUMENTS

| | | | |
|---|---|---|---|
| WO | WO 97/18166 | * | 5/1997 |
| WO | 02060825 | | 8/2002 |
| WO | WO 02/060825 | * | 8/2002 |

* cited by examiner

SOLVENT REMOVAL PROCESS

CROSS REFERENCE TO RELATED APPLICATIONS

This application is a continuation of U.S. application Ser. No. 10/566,389, filed May 26, 2006, now U.S. Pat. No. 7,879, 243, which is a §371 nationalization of PCT/GB04/03242, filed Jul. 28, 2004 which claims priority to GB 0317839.9, filed Jul. 30, 2003, the entire content of each reference incorporated by reference herein.

The present invention relates to a process for removing a solvent from a solution. In particular, although not exclusively, the present invention relates to a process for removing water from an aqueous solution, such as seawater.

Various methods for removing solvents from solutions are known. For example, water may be extracted from seawater by distillation methods such as multi-stage flash distillation. In a multi-stage flash distillation process, seawater is introduced into a series of tubes and heated to an elevated temperature. The heated seawater is then introduced into an evaporation chamber and subjected to a pressure below its vapour pressure. The sudden reduction in pressure causes boiling or flashing to occur. The flashed vapours are separated from the salty residue by condensation on the tubes of the incoming seawater streams. A series of evaporation chambers are employed. Thus, the evaporation or flashing step occurs in multiple stages.

Water may also be separated from seawater by reverse osmosis. In reverse osmosis, seawater is placed on one side of a semi-permeable membrane and subjected to pressures of 5 to 8 MPa. The other side of the membrane is maintained at atmospheric pressure. The resulting pressure differential causes water to flow across the membrane, leaving a salty concentrate on the pressurized side of the membrane. Typically, the semi-permeable membranes have an average pore size of, for example, 1 to 5 Angstroms.

After a period of operation, the pores of the semi-permeable membrane may become obstructed by deposited salts, biological contaminants and suspended particles in the seawater. Thus, higher pressures may be required to maintain the desired level of flow across the membrane. The increased pressure differential may encourage further clogging to occur. Thus, the membranes must be cleaned and replaced at regular intervals, interrupting the continuity of the process and increasing operational costs.

Attempts have been made to reduce the level of clogging of the membrane. For example, the seawater may be pretreated to remove suspended particles and biological matter. Alternatively or additionally, the residual solution on the high-pressure side of the membrane may be discharged at regular intervals to prevent the osmotic pressure from exceeding a predetermined threshold.

According to a first aspect of the present invention, there is provided a process for removing a solvent from a first solution, said process comprising
  positioning a selective membrane between the first solution and a second solution having a higher osmotic potential than the first solution, such that solvent from the first solution passes across the membrane to dilute the second solution, and
  extracting solvent from the second solution,
  wherein the membrane has an average pore size of at least 10 Angstroms,
  wherein the second solution contains solute species that are too large to pass through the pores of the membrane.

Preferably, the membrane has an average pore size of from 10 to 80 Angstroms, more preferably, 15 to 50 Angstroms. In a preferred embodiment, the membrane has an average pore size of from 20 to 30 Angstroms. The pore size of the membrane may be selected depending on the size of the solvent molecules that require separation. In general, the larger the pore size, the greater the flux through the membrane.

Any suitable selective membrane may be used in the process of the present invention. An array of membranes may be employed. Suitable selective membranes include integral membranes and composite membranes. Specific examples of suitable membranes include membranes formed of cellulose acetate (CA) and membranes formed of polyamide (PA). Preferably, the membrane is an ion-selective membrane.

The membrane may be planar or take the form of a tube or hollow fibre. If desired, the membrane may be supported on a supporting structure, such as a mesh support. The membrane may be corrugated or of a tortuous configuration.

In one embodiment, one or more tubular membranes may be disposed within a housing or shell. The first solution may be introduced into the housing, whilst the second solution may be introduced into the tubes. As the osmotic potential of the first solution is lower than that of the second solution, solvent will diffuse across the membrane from the first solution into the second solution. Thus, the second solution will become increasingly diluted and the first solution, increasingly concentrated. The diluted second solution may be recovered from the interior of the tubes, whilst the concentrated first solution may be removed from the housing.

When a planar membrane is employed, the sheet may be rolled such that it defines a spiral in cross-section.

One or more solutes may be present in each of the solutions. In a preferred embodiment, the first solution comprises a plurality of solutes, whilst the second solution is formed by dissolving one or more known solutes in a solvent.

In the process of the present invention, the first solution is placed on one side of a selective membrane. A second solution having a higher osmotic potential is placed on the opposite side of the membrane. Typically, although not exclusively, the second solution has a higher solute concentration (and therefore lower solvent concentration) than first solution.

As a result of the difference in osmotic potential between the first solution and the second solution, solvent passes across the membrane from the side of low osmotic potential to the side of high osmotic potential. The flow occurs with a high flux due to the large average pore size of the membrane. High pressures are not required to induce solvent flow. However, a pressure differential across the membrane may be applied, for example, to enhance the speed of the separation process.

Although the solute species in the first solution may be sufficiently small to pass through the pores of the membrane, they are prevented from doing so at least initially because of the high osmotic potential on the other side of the membrane. The flow of these solute species across the membrane is only possible once the osmotic potential is equal on both sides of the membrane or the osmotic potential is higher in the first solution.

The second solution contains solute species that are too large to pass through the pores of the membrane. As a result, solvent from the first solution will diffuse into the second solution at a high rate, whilst the passage of solute between the two solutions is restricted or prevented.

Optionally, the second solution may also contain solute species that are sufficiently small to pass through the pores of the membrane. These small species will not pass across the membrane if their concentration in the second solution is below their concentration in the first solution. Thus, in a preferred embodiment, the second solution optionally contains at least one solute species that is sufficiently small to pass through the pores of the membrane in a concentration that is less than the concentration of the corresponding species in the first solution.

As solvent passes from the first solution into the second solution, the first solution becomes increasingly concentrated. Once the concentration of the first solution reaches a certain threshold, the solution may be recovered or discarded. Thus, the process of the present invention may be used to convert the first solution into a concentrated form for disposal. Alternatively, further solvent may be removed from the concentrated first solution by repeating the initial membrane separation step. Specifically, further solvent may be removed from the concentrated first solution by placing this solution on one side of a semi-permeable membrane. A further solution having an osmotic potential that is higher than that of the concentrated solution may be placed on the opposite side of the membrane, such that solvent from the concentrated first solution passes across the membrane into the further solution. The further solution may contain the same solute(s) and solvent(s) as the second solution. Alternatively, the further solution may contain different components.

After solvent from the first solution has passed into the second solution, the second solution may be recovered. The second solution may be at an elevated pressure, even when a pressure is not applied to induce solvent flow from the first solution to the second solution. This is because the flow of solvent from the first solution into the second solution occurs along a concentration gradient. This pressure may be used to aid the subsequent extraction of solvent from the second solution. For example, when solvent is extracted from the second solution by thermal methods, such as multi-stage flash distillation (MSF), the pressure of the second solution may be used to supplement the pumping of the second solution to the multi-stage flash distillation unit. When solvent is extracted from the second solution by membrane methods, such as nanofiltration and reverse osmosis, the pressure of the second solution may be used to supplement the pressure applied to the second solution to induce solvent flow from the second solution across the selectively permeable membrane. Valves and other pressure regulating devices may be used to control the pressure accordingly. One or more pumps may also be used to supplement the pressure of the process streams if necessary.

The initial flux of solvent across the membrane may be 2 to 80 $lm^{-2}\,hr^{-1}$, preferably, 5 to 40 $lm^{-2}\,hr^{-1}$, for example, 15 to 20 $lm^{-2}\,hr^{-1}$, even in the absence of an applied pressure on the first solution. However, the flux may vary depending on a number of factors such as the concentration gradient of the two solutions across the membrane.

The fluid velocity across the surface of the membrane may be varied as required to reduce the risk of fouling of the membrane. Generally, the greater the fluid velocity across the surface of the membrane, the lower the risk of fouling.

Solvent may be extracted from the second solution using any suitable method. For example, the solvent may be extracted by thermal/pressure methods (e.g. crystallization and distillation) or using a membrane. Suitable membrane methods include reverse osmosis, nanofiltration, electrodialysis reversal and ion exchange. When reverse osmosis is employed, the same type of membrane employed in the direct osmosis step may be used in the reverse osmosis step. Solvent may be extracted from the second solution using hybrid methods combining, for example, thermal and membrane methods of separation.

In a preferred embodiment, nanofiltration membranes are employed to extract solvent from the second solution.

Nanofiltration is particularly suitable for separating the large solute species of the second solution from the remainder of the solution.

Suitable nanofiltration membranes include crosslinked polyamide membranes, such as crosslinked aromatic polyamide membranes. The membranes may be cast as a "skin layer" on top of a support formed, for example, of a microporous polymer sheet. The resulting membrane has a composite structure (e.g. a thin-film composite structure). Typically, the separation properties of the membrane are controlled by the pore size and electrical charge of the "skin layer". The membranes may be suitable for the separation of components that are 0.01 to 0.001 microns in size and molecular weights of 100 $gmol^{-1}$ or above, for example, 200 $gmol^{-1}$ and above.

As well as filtering particles according to size, nanofiltration membranes can also filter particles according to their electrostatic properties. For example, in certain embodiments, the surface charge of the nanofiltration membrane may be controlled to provide desired filtration properties. For example, the inside of at least some of the pores of the nanofiltration membrane may be negatively charged, restricting or preventing the passage of anionic species, particularly multivalent anions.

Examples of suitable nanofiltration membranes include Desal-5 (Desalination Systems, Escondido, Calif.), NF 70, NF 50, NF 40 and NF 40 HF membranes (FilmTech Corp., Minneapolis, Minn.), SU 600 membrane (Toray, Japan) and NRT 7450 and NTR 7250 membranes (Nitto Electric, Japan).

The nanofiltration membranes may be packed as membrane modules. Spiral wound membranes, and tubular membranes, for example, enclosed in a shell may be employed. Alternatively, the membranes may be provided as a plate or in a frame.

A multi-stage flash distillation method (MSF) may also be employed to extract solvent from the second solution. For example, the second solution may be heated and introduced into an evaporation chamber, where it is subjected to a pressure below its vapour pressure. The sudden reduction in pressure causes boiling or flashing to occur. The flashed vapours may be separated from the remainder of the solution by condensation. A series of evaporation chambers are preferably employed. Thus, the evaporation or flashing step can take place in multiple stages. In a preferred embodiment, heat energy from the flashed vapours is transferred to the incoming solution by heat exchange. As a result of this transfer of heat, the vapours are condensed and the temperature of the incoming solution increased.

Multiple effect distillation (MED) may also be employed to extract solvent from the second solution. Multiple effect distillation takes place in a series of effects and uses the principle of reducing the ambient pressure in the various effects. This permits the second solution to boil in a series of stages without the need for additional heat to be supplied after the first effect.

In multiple effect distillation, the second solution may be preheated and sprayed onto the surface of evaporator tubes as a thin film of liquid. The tubes are heated by passing a steam through the tubes. Thus, on coming into contact with the heated surface of the tubes, the sprayed liquid evaporates. This vapour is used to heat the evaporator tubes of the next effect and the transfer of heat causes the vapour in the tubes to condense. By evaporating and condensing the second solution in this manner, the solvent from the second solution may be recovered.

The efficiency of the multiple effect distillation step may be increased by compressing the vapour of at least one of the effects. The combination of multiple effect distillation and compression is known as MED-thermo compression.

Mechanical vapour compression (MVD) may also be used to extract solvent from the second solution. In mechanical vapour compression, vapour from a vessel is typically extracted and then condensed by compression in a tube located within the vessel. The compression and condensation step generates heat, which heats the walls of the tube. When second solution is sprayed onto the surface of the tube, it evaporates generating more vapour. By repeating the extraction, compression and condensation steps, further solvent may be recovered from the second solution.

Rapid spray desalination may also be used to extract the solvent from the second solution.

A thermal separation unit that separates dissolved solutes by crystallization may also be employed to extract the solvent from the second solution. For example, the second solution may be cooled in a thermal separation column such that at least some of the dissolved solutes precipitate out of solution. These precipitates may collect at the bottom of the column, leaving the solution at the top of the column with a reduced solute concentration. This "upper" solution may be retrieved, for example, for direct use or for further purification. On the other hand, the concentrated solution at the base of the column may be heated to dissolve any precipitates. The concentrated solution may be discarded or recycled to be used again as a fresh second solution. When using a crystallization method to separate the solvent from the second solution, the second solution is preferably formed using a salt having a solubility in the solvent of the second solution that is sensitive to temperature variation. Examples of such salts include hydrogenphosphates such as disodium hydrogenphosphate ($Na_2HPO_4.12H_2O$).

Solvent may also be recovered from the second solution by introducing micro-organisms into the second solution to convert the solutes dissolved in the second solution into insoluble products (i.e. bio-desalting). These insoluble products may then be separated from the solvent, for example, by filtration. Alternatively, a precipitating agent may be added to the second solution to precipitate the dissolved solutes. The precipitates may then be removed from the solvent by, for example, filtration.

A combination of techniques may be used to extract the solvent from the second solution. In one embodiment, at least two of the following techniques are employed to extract the solvent from the second solution: crystallization, distillation, nanofiltration and reverse osmosis. Where distillation techniques are employed, at least one of multi-stage flash distillation, multiple effect distillation, mechanical vapour compression and rapid spray distillation may be employed. When more than one technique is used to extract the solvent from the second solution, the techniques may be carried out sequentially or in parallel.

In one embodiment, the second solution may be divided into two portions. The first portion may be treated by nanofiltration or reverse osmosis, whilst the second portion may treated by crystallization and/or a distillation technique selected from at least one of multi-stage flash distillation, multi-effect distillation, mechanical vapour compression, MED-thermo compression and rapid spray distillation. The residue from the nanofiltration or reverse osmosis step may be further treated by a crystallization and/or a distillation technique such as multi-flash distillation, multi-effect distillation, mechanical vapour compression, MED-thermo compression and/or rapid spray distillation.

In one example, solvent may be extracted from the second solution by membrane methods, such as nanofiltration or reverse osmosis, followed by a thermal method such as multistage flash distillation (MSF). The second solution emerging from the first membrane method step may be at an elevated osmotic pressure. For example, this pressure may be used to help to pump the second solution to the MSF unit.

In another example, solvent may be extracted from the second solution by two or more membrane separation steps that may, for example, be carried out in series. The second solution emerging from the first membrane step may be at an elevated osmotic pressure. This pressure may be used to induce solvent flow from the second solution across a subsequent selective membrane and/or semi-permeable membrane.

The solvent of the second solution may be the same or different to the solvent of the first solution. When the solvent of the second solution is different to the solvent of the first solution, the extracted solvent will contain a mixture of solvents from the first solution and the second solution. This may be useful, for example, when it is desired to produce a mixture of two solvents from separate impure solutions.

Preferably, the solvent in the first solution is the same as that of the second solution. Thus, the extracted solvent consists essentially of a single solvent. The extracted solvent may be recovered and used in its recovered form, or treated further prior to use. For example, when the extracted solvent is water, the water may be stabilized, for example, by post-treatment stages.

When solvent is extracted from the second solution, a solid residue or residual solution generally remains behind. This residue or residual solution may be discarded.

Alternatively, the solid residue may be recovered and used to make fresh second solution for extracting solvent from the first solution. The residual solution may also be recovered and recycled, for example, for use as fresh second solution for extracting solvent from the first solution. In certain cases, it may be possible to use the residual solution directly as fresh second solution. In other cases, it may be necessary to pretreat the residual solution, for example, by varying its concentration accordingly.

The first solution typically contains a solvent that requires purification. Thus, the process of the present invention may be used to purify organic solvents, such as hydrocarbons (e.g. aliphatic and aromatic hydrocarbons). Mixtures of organic solvents may be purified. The hydrocarbons may be straight chain, branched and/or cyclic. Examples include, but are not limited to, alkanes, alkenes and alkynes. The hydrocarbons may be substituted with one or more heteroatoms, for example, fluorine, chlorine, bromine, iodine, oxygen, sulphur, nitrogen, and/or phosphorus atoms. In one embodiment, oxygenated hydrocarbons, such as aldehydes, ketones, carboxylic acids, ethers, esters, alcohols and/or their derivatives may be purified. For example, glycol ethers and glycol ether esters may also be employed. Alternatively or additionally, halogenated solvents, such as chlorinated, brominated and/or fluorinated hydrocarbons may be purified.

The process of the present invention may also be used to purify inorganic solvents, such as acidic solvents, alkaline solvents and neutral solvents, such as water. Such solvents are preferably present in the first solution and may, additionally be present in the second solution. For example, the process of the present invention may be used to purify aqueous solutions of acids. Alternatively, the process of the present invention may be used to purify alkali solvents, such as aqueous hydroxide solutions.

According to a preferred embodiment of the present invention, the process is used to remove impurities from water, such as a saline solution, such as seawater or brackish water. The removal of salt impurities from seawater and brackish water is known as desalination. Alternatively, the process may be used to purify water from a waste stream, such an industrial effluent, agricultural or domestic effluent. Thus, such waste streams may be used as the first solution, or pretreated to form the first solution. Grey water streams, for example, waste washing water (e.g. laundry) and streams from gullies, may also be purified. In one embodiment, waste water from car washes, launderettes and boiler feed streams at power plants may be purified using the process of the present invention for reuse.

The process of the present invention may also be used to purify water from other sources, for example, water from rivers or underground sources. Domestic water sources may also be purified by the present invention to produce drinking water.

The purified water stream may be used for a variety of applications, for example, for industrial, agricultural, commercial and domestic use (e.g. to produce drinking water). In one embodiment, the purified water to pump oil from oil wells. (For avoidance of doubt, the term "purified water" means water that has been treated by the process of the present invention. Thus, the purified water stream may include one or more dissolved salts.) In conventional methods for oil recovery, seawater is injected into an oil well to force the oil from the well to the surface. The use of seawater, however, causes severe operational and scaling problems. Moreover, it can be difficult to separate seawater from oil, giving rise to separation problems once the oil is recovered. By using a purified water, these problems may be alleviated and/or eliminated. In addition, the purified water may be at an elevated osmotic pressure; this increased pressure may be used to aid pumping the water into the oil well.

The second solution is a solution containing solute species that are too large to pass through the pores of the membrane. In one embodiment, substantially all the solute species present in the second solution are too large to pass through the pores of the membrane. Suitable solute species may have a molecular weight of from 50 to 10000 gmol$^{-1}$, preferably, 150 to 5000 gmol$^{-1}$, and more preferably, 200 to 2000 gmol$^{-1}$.

Suitable solutes for the second solution include organic compounds, biological compounds and/or inorganic compounds.

Suitable organic compounds include hydrocarbons, such as aliphatic and aromatic hydrocarbons. Mixtures of two or more organic compounds may be employed. The hydrocarbons may be straight chain, branched and/or cyclic. Examples of suitable hydrocarbons include, but are not limited to, alkanes, alkenes and alkynes. The hydrocarbons may be substituted with one or more heteroatoms, for example, fluorine, chlorine, bromine, iodine, oxygen, sulphur, nitrogen, and/or phosphorus atoms. In one embodiment, oxygenated hydrocarbons, such as aldehydes, ketones, carboxylic acids, ethers, esters, alcohols and/or their derivatives may be employed. The organic solute species may have a molecular weight of from 200 to 10000 gmol$^{-1}$, preferably, 300 to 5000 gmol$^{-1}$, more preferably, 400 to 2000 gmol$^{-1}$ and, even more preferably, 500 to 1000 gmol$^{-1}$.

Suitable biological compounds include proteins, amino acids, nucleic acids, carbohydrates and lipids. Mixtures of two or more biological compounds may be employed. Preferred biological solutes include sugars, such as cane sugar and/or beet sugar. Glucose, fructose and sucrose may also be employed. The biological solute species may have a molecular weight of from 100 to 10000 gmol$^{-1}$, preferably, 300 to 5000 gmol$^{-1}$, more preferably, 400 to 2000 gmol$^{-1}$ and, even more preferably, 500 to 1000 gmol$^{-1}$.

Suitable inorganic compounds include acids, bases and salts. Mixtures of two or more inorganic compounds may be employed. In a preferred embodiment, the solute in the second solution is a salt. The salt may have cationic and/or anionic species that are larger than the average pore size of the membrane. Preferably, both the solvated cationic and anionic species of the salt are larger than the average pore size of the membrane.

Suitable cationic species include metal ions and ammonium ions. Suitable metal ions include ions of Groups I to III metals. Examples of suitable Group I metal ions include ions of sodium and potassium. Examples of suitable Group II metal ions include ions of magnesium, calcium, strontium and barium. Examples of suitable Group II cations include ions of aluminium. Complex cations may also be employed.

Where ammonium ions are employed, such ions may be substituted, for example, with alkyl groups, such as $C_1$ to $C_{20}$ alkyl groups. Substituted alkyl groups may also be employed.

The cations preferably have an average diameter of greater than 10 Angstroms in solvated (e.g. hydrated) form. Preferably, the metal cations have diameters from 11 to 100 Angstroms, more preferably, from 15 to 50 Angstroms in solvated (e.g. hydrated) form.

Suitable anionic species include fluorides, chlorides, bromides, iodides, sulphates, sulphites, sulphides, carbonates, hydrogencarbonates, nitrates, nitrites, nitrides, phosphates, hydrogenphosphates, aluminates, borates, bromates, carbides, chlorides, perchlorates, hypochlorates, chromates, fluorosilicates, fluorosilicates, fluorosulphates, silicates, cyanides and cyanates.

The anions preferably have an average diameter of at least 5 Angstroms in solvated form. Preferably, the anions have diameters from 5 to 50 Angstroms, more preferably, from 10 Angstroms to 40 Angstroms, and more preferably, 20 to 30 Angstroms in solvated form.

Preferred salts include magnesium sulfate ($MgSO_4.6H_2O$ or $MgSO_4.7H_2O$), magnesium chloride ($MgCl_2.6H_2O$), sodium sulfate ($Na_2SO_4.10H_2O$), calcium chloride ($CaCl_2.2H_2O$ or $CaCl_2.6H_2O$), disodium hydrogenphosphate ($Na_2HPO_4.12H_2O$). and potassium alum ($24H_2O$).

Optionally, in addition to solutes that are too large to pass through the pores of the membrane, the second solution may also include solutes that are sufficiently small to pass through the pores of the membrane. Examples of such solutes include alkali metal halides, such as alkali metal chlorides, for example, as sodium chloride and potassium chloride.

These smaller salts may be separated from the second solution using the same or a different separation method to that employed to separate the larger solutes from the second solution. Thus, the smaller solutes may be separated by membrane methods and thermal methods, such as the ones described above. In one embodiment, the larger solutes are separated by a different method to that employed to separate the smaller solutes from the second solution. For example, the larger solutes may be separated by nanofiltration, and the smaller solutes may be separated by at least one of direct osmosis, reverse osmosis, crystallization and/or distillation techniques.

The second solution may be formed of an organic and/or inorganic solvent. Suitable organic solvents include hydrocarbons, such as aliphatic and aromatic hydrocarbons. Mixtures of organic solvents may be employed. The hydrocarbons may be straight chain, branched and/or cyclic. Examples include, but are not limited to, alkanes, alkenes and alkynes. The hydrocarbons may be substituted with one or more heteroatoms, for example, fluorine, chlorine, bromine, iodine, oxygen, sulphur, nitrogen, and/or phosphorus atoms. In one embodiment, oxygenated hydrocarbons, such as aldehydes, ketones, carboxylic acids, ethers, esters, alcohols and/or their derivatives may be employed. For example, glycol ethers and glycol ether esters may also be employed. Alternatively or additionally, halogenated solvents, such as chlorinated, brominated and/or fluorinated hydrocarbons may be employed.

Suitable inorganic solvents include acidic solvents, alkaline solvents and/or water. Water is preferably employed as solvent in the second solution.

Preferably, the second solution has a known composition. For example, in one embodiment, the second solution is formed by introducing a known quantity of a solute into a known quantity of solvent. Preferably, the second solution consists essentially of a selected solute dissolved in a selected solvent. By forming the second solution in this manner, a substantially clean solution may be produced. Preferably, the second solution has a reduced concentration of suspended particles, biological matter and/or other components that may cause fouling of the apparatus used to extract solvent from the second solution. More preferably, the second solution is substantially free of such components. Thus, membrane techniques may be used to extract solvent from the second solution without fear of the pores of the membrane being subjected to unacceptably high levels of fouling, for example, by biological matter or suspended particles.

Preferably, the second solution is an aqueous solution of at least one salt. The salt may be selected from one or more of magnesium sulfate ($MgSO_4.6H_2O$ or $MgSO_4.7H_2O$), magnesium chloride ($MgCl_2.6H_2O$), sodium sulfate ($Na_2SO_4.10H_2O$), calcium chloride ($CaCl_2.2H_2O$ or $CaCl_2.6H_2O$), disodium hydrogenphosphate ($Na_2HPO_4.12H_2O$) and potassium alum ($24H_2O$).

Alternatively, the second solution is an aqueous solution of sugar, such as glucose, fructose and/or sucrose. The sugar may be derived from any suitable source. For example, beet sugar and/or cane sugar may be employed.

In a preferred embodiment, a saline solution (e.g. seawater or brackish water) is used as the first solution and is placed on one side of the membrane. A second solution having a higher solute concentration than the solute concentration of the saline solution is placed on the other side of the membrane. Preferably, an aqueous solution of magnesium sulfate magnesium sulfate ($MgSO_4.6H_2O$ or $MgSO_4.7H_2O$), magnesium chloride ($MgCl_2.6H_2O$), sodium sulfate ($Na_2SO_4.10H_2O$), calcium chloride ($CaCl_2.2H_2O$ or $CaCl_2.6H_2O$) and disodium hydrogenphosphate ($Na_2HPO_4.12H_2O$). potassium alum ($24H_2O$) and/or a sugar, such as glucose, fructose and/or sucrose is employed as the second solution. As mentioned above, additional solutes, such as those that are sufficiently small to pass through the pores of the membrane may be included. Examples of such solutes include sodium chloride and potassium chloride.

The second solution may contain chemical additives such as anti-scaling agents, corrosion inhibitors, anti-fouling agents and disinfectants. These additives may be contained in the system, for example, when the second solution is circulated in a continuous loop.

The difference in solute concentration on either side of the membrane (or osmotic potential) causes water from the saline solution (e.g. seawater or brackish water) to pass into the second solution by osmosis. As the flow of water occurs along the concentration gradient, high pressures are not required to induce flow. However, a pressure differential across the membrane may be used, if desired.

Although the dissolved species in the first solution may be sufficiently small to pass through the pores of the membrane, they are prevented from doing so because of the high osmotic potential on the other side of the membrane. As the second solution contains solute species that are too large to pass through the pores of the membrane, these solute species are prevented from passing through to the other side of the membrane. As a result, water from the first solution will diffuse into the second solution at a high rate, whilst the passage of solute between the two solutions is restricted or prevented.

This separation step may be carried out in the absence of an applied pressure. Thus, although fouling of the membrane may occur, for example, by biological matter (e.g. seaweed, algae, bacteria, fungi and plankton) and suspended particles (e.g. dirt, soil, mud, silt, organic colloids, silica, precipitates and sand particles) in the saline solution (e.g. seawater or brackish water), the membrane may be cleaned or replaced without interrupting an expensive stage of the process. Moreover, as this separation step may be carried out without pressurization, there is no need to re-pressurize the membrane when re-starting the process.

The flow of water from the saline solution dilutes the second solution. Water is then extracted from the diluted second solution. Suitable extraction techniques include the distillation and membrane methods described above. As described above, a combination of two or more of these extraction techniques may be used.

In one embodiment, reverse osmosis is employed. In reverse osmosis, the second solution may be placed on one side of a semi-permeable membrane, and subjected to a high pressure. The other side of the membrane is maintained at a lower pressure. The resulting pressure differential causes solvent (e.g. water) to flow across the membrane, leaving behind a residual solution on the pressurized side of the membrane.

Any selectively membrane may be employed in the reverse osmosis step. For example, conventional semi-permeable membranes and nanofiltration membranes may be employed.

The pressure differential employed in reverse osmosis may be about 0.1 to 20 MPa, preferably, about 0.5 to 15 MPa, more preferably, about 0.7 to 7 MPa, and most preferably, about 1 to 3 MPa. One side of the membrane may be pressurized, whilst the other side may be maintained at atmospheric or a sub-atmospheric pressure. Preferably, only one side of the membrane is pressurized. The pressurized side of the membrane may be subjected to a pressure of about 0.1 to 20 MPa, preferably, about 0.5 to 15 MPa, more preferably, about 0.7 to 7 MPa, and most preferably, about 1 to 3 MPa. It should be understood that the precise pressure required would vary depending, for example, on the relative solute concentrations of the solutions on either side of the membrane.

As explained above, the second solution may contain a lower concentration of components that cause membrane fouling (e.g. biological matter and suspended particles) than the first solution. The second solution may also contain chemical additives such as anti-scaling agents, corrosion inhibitors, anti-fouling agents and disinfectants. In such embodiments, the pressure required to extract solvent from the diluted second solution by reverse osmosis is generally less than the pressure required to extract solvent from the first solution by reverse osmosis using first solution directly. For example, pressures of 5 to 8 MPa are required to desalinate seawater directly by reverse osmosis.

The process of the present invention may be continuous or a batch process.

The flow of solvent across a membrane is generally influenced by thermal conditions. Thus, the solutions on either side of the membrane may be heated or cooled, if desired. The solutions may be heated to temperatures of 30 to 100° C., for example, 40 to 80° C. Alternatively, the solutions may be cooled to −20 to 20° C., for example, 7 to 12° C. The solution on one side of the membrane may be heated, while the other side cooled. The heating or cooling may be carried out on each solution independently. Chemical reactions may also be carried out on either side of the membrane, if desired.

The process of the present invention may further comprise a pre-treatment step of removing contaminants, such as suspended particles and biological matter, from the first solution (e.g. a waste stream, seawater or brackish water). Additionally or alternatively, a threshold inhibitor to control scaling may be added to the first solution. Pre-treatment steps to alter the pH of the first solution may also be employed. Where seawater is used as the first solution, deep seawater is preferably employed as generally contains fewer suspended particles and less biological matter than seawater obtained from the surface of the ocean. The process of extracting solvent from the first solution may optionally be carried out at surface of the ocean or by the coast.

The osmotic potential of the second solution may be enhanced by microwave, laser electromagnetic, electric fields (electro osmosis) and electrokinetic treatment.

According to a second aspect of the present invention, there is provided a process for removing a solvent from a first solution, said process comprising
    positioning a selective membrane between the first solution and a second solution having a higher osmotic potential than the first solution, such that solvent from the first solution passes across the membrane to dilute the second solution, and
    recovering solvent from the second solution by a technique selected from precipitation, bio-desalting, multi-stage flash distillation, multi-effect desalination, mechanical vapour compression, rapid spray desalination and nano-filtration.

Any suitable selective membrane may be used in the process of the present invention. The membrane may have an average pore size of 1 to 80 Angstroms, preferably, 5 to 70 Angstroms, more preferably, 10 to 65 Angstroms, for example, 15 to 50 Angstroms. In one embodiment, the membrane has an average pore size of 20 to 30 Angstroms.

Suitable selective membranes include integral membranes and composite membranes. Specific examples of suitable membranes include membranes formed of cellulose acetate (CA) and membranes formed of polyamide (PA). Preferably, the membrane is an ion-selective membrane. Conventional semi-permeable membranes may also be employed.

The membrane may be planar or take the form of a tube or hollow fibre. If desired, the membrane may be supported on a supporting structure, such as a mesh support. The membrane may be corrugated or of a tortuous configuration.

In one embodiment, one or more tubular membranes may be disposed within a housing or shell. The first solution may be introduced into the housing, whilst the second solution may be introduced into the tubes. As the solvent concentration of the first solution is higher than that of the second, solvent will diffuse across the membrane from the first solution into the second solution. Thus, the second solution will become increasingly diluted and the first solution, increasingly concentrated. The diluted second solution may be recovered from the interior of the tubes, whilst the concentrated first solution may be removed from the housing.

When a planar membrane is employed, the sheet may be rolled such that it defines a spiral in cross-section.

One or more solutes may be present in each of the solutions. In a preferred embodiment, the first solution comprises a plurality of solutes, whilst the second solution is formed by dissolving one or more known solutes in a solvent.

In the process of the present invention, the first solution is placed on one side of a selective membrane. A second solution having a higher osmotic potential is placed on the opposite side of the membrane. Typically, although not exclusively, the second solution has a higher solute concentration (and therefore lower solvent concentration) than first solution.

As a result of the difference in osmotic potential between the first solution and the second solution, solvent passes across the membrane from the side of low osmotic potential to the side of high osmotic potential. High pressures are not required to induce solvent flow. However, a pressure differential across the membrane may be applied, for example, to enhance the speed of the separation process.

Although the solute species in the first solution may be sufficiently small to pass through the pores of the membrane, they are prevented from doing so because of the high osmotic potential on the other side of the membrane.

As solvent passes from the first solution into the second solution, the first solution becomes increasingly concentrated. Once the concentration of the first solution reaches a certain threshold, the solution may be recovered or discarded. Thus, the process of the present invention may be used to convert the first solution into a concentrated form for disposal. Alternatively, further solvent may be removed from the concentrated first solution by repeating the initial membrane separation step. Specifically, further solvent may be removed from the concentrated first solution by placing this solution on one side of a semi-permeable membrane. A further solution having an osmotic potential that is higher than that of the concentrated solution may be placed on the opposite side of the membrane, such that solvent from the concentrated first solution passes across the membrane into the further solution. The further solution may contain the same solute(s) and solvent(s) as the second solution. Alternatively, the further solution may contain different components.

After solvent from the first solution has passed into the second solution, the second solution may be recovered. The second solution may be at an elevated pressure, even when a pressure is not applied to induce solvent flow from the first solution to the second solution. This is because the flow of solvent from the first solution into the second solution occurs along a concentration gradient. This pressure may be used to aid the subsequent extraction of solvent from the second solution. For example, when solvent is extracted from the second solution by membrane methods, such as nanofiltration and reverse osmosis, the pressure of the second solution may be used to supplement the pressure applied to the second solution to induce solvent flow from the second solution across the selectively permeable membrane employed. For example, when solvent is extracted from the second solution by thermal methods, such as multi-stage flash distillation (MSF), the pressure of the second solution may be used to supplement the pumping of second solution to the MSF unit. Valves and other pressure regulating devices may be used to control the pressure accordingly. One or more pumps may also be used to supplement the pressure of the process streams if necessary.

The initial flux of solvent across the membrane may be 2 to 80 $lm^{-2} hr^{-1}$, preferably, 5 to 40 $lm^{-2} hr^{-1}$, for example, 15 to 20 $lm^{-2} hr^{-1}$, even in the absence of an applied pressure on the first solution. However, the flux may vary depending on a number of factors such as the concentration gradient of the two solutions across the membrane.

The fluid velocity across the surface of the membrane may be varied as required to reduce the risk of fouling of the membrane. Generally, the greater the fluid velocity across the surface of the membrane, the lower the risk of fouling.

Solvent may be extracted from the second solution using any suitable method. For example, the solvent may be extracted by thermal/pressure methods (e.g. distillation) or using a membrane. Suitable membrane methods include reverse osmosis, nanofiltration, electrodialysis, reversal and ion exchange. When reverse osmosis is employed, the same type of membrane employed in the direct osmosis step may be used in the reverse osmosis step. Solvent may be extracted from the second solution using hybrid methods combining, for example, thermal and membrane methods of separation.

In a preferred embodiment, nanofiltration membranes are employed to extract solvent from the second solution. Nanofiltration is particularly suitable for separating the large solute species of the second solution from the remainder of the solution.

Suitable nanofiltration membranes include crosslinked polyamide membranes, such as crosslinked aromatic polyamide membranes. The membranes may be cast as a "skin layer" on top of a support formed, for example, of a microporous polymer sheet. The resulting membrane has a composite structure (e.g. a thin-film composite structure). Typically, the separation properties of the membrane are controlled by the pore size and electrical charge of the "skin layer". The membranes may be suitable for the separation of components that are 0.01 to 0.001 microns in size and molecular weights of 100 gmol$^{-1}$ or above, for example, 200 gmol$^{-1}$ and above.

As well as filtering particles according to size, nanofiltration membranes can also filter particles according to their electrostatic properties. For example, in certain embodiments, the surface charge of the nanofiltration membrane may be controlled to provide desired filtration properties. For example, the inside of at least some of the pores of the nanofiltration membrane may be negatively charged, restricting or preventing the passage of anionic species, particularly multivalent anions.

Examples of suitable nanofiltration membranes include Desal-5 (Desalination Systems, Escondido, Calif.), NF 70, NF 50, NF 40 and NF 40 HF membranes (FilmTech Corp., Minneapolis, Minn.), SU 600 membrane (Toray, Japan) and NRT 7450 and NTR 7250 membranes (Nitto Electric, Japan).

The nanofiltration membranes may be packed as membrane modules. Spiral wound membranes, and tubular membranes, for example, enclosed in a shell may be employed. Alternatively, the membranes may be provided as a plate or in frame.

A multi-stage flash distillation method (MSF) may also be employed to extract solvent from the second solution. For example, the second solution may be heated and introduced into an evaporation chamber, where it is subjected to a pressure below its vapour pressure. The sudden reduction in pressure causes boiling or flashing to occur. The flashed vapours may be separated from the remainder of the solution by condensation. A series of evaporation chambers are preferably employed. Thus, the evaporation or flashing step can take place in multiple stages. In a preferred embodiment, heat energy from the flashed vapours is transferred to the incoming solution by heat exchange. As a result of this transfer of heat, the vapours are condensed and the temperature of the incoming solution increased.

Multiple effect distillation (MED) may also be employed to extract solvent from the second solution. Multiple effect distillation takes place in a series of effects and uses the principle of reducing the ambient pressure in the various effects. This permits the second solution to boil in a series of stages without the need for additional heat to be supplied after the first effect.

In multiple effect distillation, the second solution may be preheated and sprayed onto the surface of evaporator tubes as a thin film of liquid. The tubes are heated by passing a steam through the tubes. Thus, on coming into contact with the heated surface of the tubes, the sprayed liquid evaporates. This vapour is used to heat the evaporator tubes of the next effect and the transfer of heat causes the vapour in the tubes to condense. By evaporating and condensing the second solution in this manner, the solvent from the second solution may be recovered.

The efficiency of the multiple effect distillation step may be increased by compressing the vapour of at least one of the effects. The combination of multiple effect distillation and compression is known as MED-thermo compression.

Mechanical vapour compression (MVD) may also be used to extract solvent from the second solution. In mechanical vapour compression, vapour from a vessel is typically extracted and then condensed by compression in a tube located within the vessel. The compression and condensation step generates heat, which heats the walls of the tube. When second solution is sprayed onto the surface of the tube, it evaporates generating more vapour. By repeating the extraction, compression and condensation steps, further solvent may be recovered from the second solution.

Rapid spray desalination may also be used to extract the solvent from the second solution.

A thermal separation unit that separates dissolved solutes by crystallization may also be employed to extract the solvent from the second solution. For example, the second solution may be cooled in a thermal separation column such that at least some of the dissolved solutes precipitate out of solution. These precipitates may collect at the bottom of the column, leaving the solution at the top of the column with a reduced solute concentration. This "upper" solution may be retrieved, for example, for direct use or for further purification. On the other hand, the concentrated solution at the base of the column may be heated to dissolve any precipitates. The concentrated solution may be discarded or recycled to be used again as a fresh second solution. When using a crystallization method to separate the solvent from the second solution, the second solution is preferably formed using a salt having a solubility in the solvent of the second solution that is sensitive to temperature variation. Examples of such salts include hydrogenphosphates such as disodium hydrogenphosphate ($Na_2HPO_4.12H_2O$).

Solvent may also be recovered from the second solution by introducing micro-organisms into the second solution to convert the solutes dissolved in the second solution into insoluble products (i.e. bio-desalting). These insoluble products may then be separated from the solvent, for example, by filtration. Alternatively, a precipitating agent may be added to the second solution to precipitate the dissolved solutes. The precipitates may then be removed from the solvent by, for example, filtration.

A combination of techniques may be used to extract the solvent from the second solution. In one embodiment, at least two of the following techniques are employed to extract the solvent from the second solution: crystallization, distillation, nanofiltration and reverse osmosis. Where distillation techniques are employed, at least one of multi-stage flash distillation, multiple effect distillation, mechanical vapour compression and rapid spray distillation may be employed. When more than one technique is used to extract the solvent from the second solution, the techniques may be carried out sequentially or in parallel.

In one embodiment, the second solution may be divided into two portions. The first portion may be treated by crystallization and/or nanofiltration or reverse osmosis, whilst the second portion may treated by crystallization and/or a distillation technique selected from at least one of multi-flash distillation, multi-effect distillation (including MED-thermo compression), mechanical vapour compression, and rapid spray distillation. The residue from the nanofiltration or reverse osmosis step may be further treated by crystallization and/or a distillation technique such as multi-flash distillation, multi-effect distillation, mechanical vapour compression, and/or rapid spray distillation.

In another embodiment, solvent may be extracted from the second solution by a membrane technique followed by crystallization and/or thermal distillation such as multistage flash distillation, multi-effect distillation, mechanical vapour compression, and/or rapid spray distillation. Suitable membrane techniques include nanofiltration and reverse osmosis. A selective membrane having an average pore size of at least 10 Angstroms may be employed (see first aspect of the present invention). Alternatively, a conventional semi-permeable membrane may be used.

The solvent of the second solution may be the same or different to the solvent of the first solution. When the solvent of the second solution is different to the solvent of the first solution, the extracted solvent will contain a mixture of solvents from the first solution and the second solution. This may be useful, for example, when it is desired to produce a mixture of two solvents from separate impure solutions.

Preferably, the solvent in the first solution is the same as that of the second solution. Thus, the extracted solvent consists essentially of a single solvent. The extracted solvent may be recovered and used in its recovered form, or treated further prior to use. For example, when the extracted solvent is water, the water may be stabilized, for example, by post-treatment stages.

When solvent is extracted from the second solution, a solid residue or residual solution generally remains behind. This residue or residual solution may be discarded.

Alternatively, the solid residue may be recovered and used to make fresh second solution for extracting solvent from the first solution. The residual solution may also be recovered and recycled, for example, for use as fresh second solution for extracting solvent from the first solution. In certain cases, it may be possible to use the residual solution directly as fresh second solution. In other cases, it may be necessary to pretreat the residual solution, for example, by varying its concentration accordingly.

The first solution typically contains a solvent that requires purification. Thus, the process of the present invention may be used to purify organic solvents, such as hydrocarbons (e.g. aliphatic and aromatic hydrocarbons). Mixtures of organic solvents may be purified. The hydrocarbons may be straight chain, branched and/or cyclic. Examples include, but are not limited to, alkanes, alkenes and alkynes. The hydrocarbons may be substituted with one or more heteroatoms, for example, fluorine, chlorine, bromine, iodine, oxygen, sulphur, nitrogen, and/or phosphorus atoms. In one embodiment, oxygenated hydrocarbons, such as aldehydes, ketones, carboxylic acids, ethers, esters, alcohols and/or their derivatives may be purified. For example, glycol ethers and glycol ether esters may also be employed. Alternatively or additionally, halogenated solvents, such as chlorinated, brominated and/or fluorinated hydrocarbons may be purified.

The process of the present invention may also be used to purify inorganic solvents, such as acidic solvents, alkaline solvents and neutral solvents, such as water. Such solvents are preferably present in the first solution and may, additionally be present in the second solution. For example, the process of the present invention may be used to purify aqueous solutions of acids. Alternatively, the process of the present invention may be used to purify alkali solvents, such as aqueous hydroxide solutions.

According to a preferred embodiment of the present invention, the process is used to remove impurities from water, such as a saline solution, such as seawater or brackish water. The removal of salt impurities from seawater and brackish water is known as desalination. Alternatively, the process may be used to purify water from a waste stream, such an industrial effluent, domestic or agricultural effluent. Thus, such waste streams may be used as the first solution, or pretreated to form the first solution. Grey water streams, for example, waste washing water (e.g. laundry) and streams from gullies, may also be purified. In one embodiment, waste water from car washes, launderettes and boiler feed streams at power plants may be purified using the process of the present invention for reuse.

The process of the present invention may also be used to purify water from other sources, for example, water from rivers or underground sources. Domestic water sources may also be purified using the method of the present invention to produce drinking water.

The purified water stream may be used for a variety of applications, for example, for industrial, agricultural, commercial and domestic use (e.g. to produce drinking water). In one embodiment, the purified water to pump oil from oil wells. (For avoidance of doubt, the term "purified water" means water that has been treated by the process of the present invention. Thus, the purified water stream may include one or more dissolved salts.) In conventional methods for oil recovery, seawater is injected into an oil well to force the oil from the well to the surface. The use of seawater, however, causes severe operational and scaling problems. Moreover, it can be difficult to separate seawater from oil, giving rise to separation problems once the oil is recovered. By using a purified water, these problems may be alleviated and/or eliminated. In addition, the purified water may be at an elevated osmotic pressure; this increased pressure may be used to aid pumping the water into the oil well.

The second solution is a solution containing solute species that are too large to pass through the pores of the membrane. In one embodiment, substantially all the solute species present in the second solution are too large to pass through the pores of the membrane. Suitable solute species may have a molecular weight of from 50 to 10000 $gmol^{-1}$, preferably, 100 to 5000 $gmol^{-1}$, and more preferably, 200 to 2000 $gmol^{-1}$.

Suitable solutes for the second solution include organic compounds, biological compounds and/or inorganic compounds.

Suitable organic compounds include hydrocarbons, such as aliphatic and aromatic hydrocarbons. Mixtures of two or more organic compounds may be employed. The hydrocarbons may be straight chain, branched and/or cyclic. Examples of suitable hydrocarbons include, but are not limited to, alkanes, alkenes and alkynes. The hydrocarbons may be substituted with one or more heteroatoms, for example, fluorine, chlorine, bromine, iodine, oxygen, sulphur, nitrogen, and/or phosphorus atoms. In one embodiment, oxygenated hydrocarbons, such as aldehydes, ketones, carboxylic acids, ethers, esters, alcohols and/or their derivatives may be employed. The organic solute species may have a molecular weight of from 100 to 10000 gmol$^{-1}$, preferably, 300 to 5000 gmol$^{-1}$, more preferably, 400 to 2000 gmol$^{-1}$ and, even more preferably, 500 to 1000 gmol$^{-1}$.

Suitable biological compounds include proteins, amino acids, nucleic acids, carbohydrates and lipids. Mixtures of two or more biological compounds may be employed. Preferred biological solutes include sugars, such as cane sugar and/or beet sugar. Glucose, fructose and sucrose may also be employed. The biological solute species may have a molecular weight of from 100 to 10000 gmol$^{-1}$, preferably, 300 to 5000 gmol$^{-1}$, more preferably, 400 to 2000 gmol$^{-1}$ and, even more preferably, 500 to 1000 gmol$^{-1}$.

Suitable inorganic compounds include acids, bases and salts. Mixtures of two or more inorganic compounds may be employed. In a preferred embodiment, the solute in the second solution is a salt. The salt may have cationic and/or anionic species that are larger than the average pore size of the membrane. Preferably, both the solvated cationic and anionic species of the salt are larger than the average pore size of the membrane.

Suitable cationic species include metal ions and ammonium ions. Suitable metal ions include ions of Groups I to III metals. Examples of suitable Group I metal ions include ions of sodium and potassium. Examples of suitable Group II metal ions include ions of magnesium, calcium, strontium and barium. Examples of suitable Group II cations include ions of aluminium. Complex cations may also be employed.

Where ammonium ions are employed, such ions may be substituted, for example, with alkyl groups, such as $C_1$ to $C_{20}$ alkyl groups. Substituted alkyl groups may also be employed.

Suitable anionic species include fluorides, chlorides, bromides, iodides, sulphates, sulphites, sulphides, carbonates, hydrogencarbonates, nitrates, nitrites, nitrides, phosphates, aluminates, borates, bromates, carbides, chlorides, hydrogenphosphates, perchlorates, hypochlorates, chromates, fluorosilicates, fluorosilicates, fluorosulphates, silicates, cyanides and cyanates.

Preferred salts include magnesium sulfate ($MgSO_4.6H_2O$ or $MgSO_4.7H_2O$), magnesium chloride ($MgCl_2.6H_2O$), sodium sulfate ($Na_2SO_4.10H_2O$), calcium chloride ($CaCl_2.2H_2O$ or $CaCl_2.6H_2O$), potassium alum ($24H_2O$), disodium hydrogenphosphate ($Na_2HPO_4.12H_2$), sodium chloride (NaCl) and potassium chloride (KCl).

The second solution may be formed of an organic and/or inorganic solvent. Suitable organic solvents include hydrocarbons, such as aliphatic and aromatic hydrocarbons. Mixtures of organic solvents may be employed. The hydrocarbons may be straight chain, branched and/or cyclic. Examples include, but are not limited to, alkanes, alkenes and alkynes. The hydrocarbons may be substituted with one or more heteroatoms, for example, fluorine, chlorine, bromine, iodine, oxygen, sulphur, nitrogen, and/or phosphorus atoms. In one embodiment, oxygenated hydrocarbons, such as aldehydes, ketones, carboxylic acids, ethers, esters, alcohols and/or their derivatives may be employed. For example, glycol ethers and glycol ether esters may also be employed. Alternatively or additionally, halogenated solvents, such as chlorinated, brominated and/or fluorinated hydrocarbons may be employed.

Suitable inorganic solvents include acidic solvents, alkaline solvents and/or water. Water is preferably employed as solvent in the second solution.

Preferably, the second solution has a known composition. For example, in one embodiment, the second solution is formed by introducing a known quantity of a solute into a known quantity of solvent. Preferably, the second solution consists essentially of a selected solute dissolved in a selected solvent. By forming the second solution in this manner, a substantially clean solution may be produced. Preferably, the second solution has a reduced concentration of suspended particles, biological matter and/or other components that may cause fouling of the apparatus used to extract solvent from the second solution. More preferably, the second solution is substantially free of such components. Thus, membrane techniques may be used to extract solvent from the second solution without fear of the pores of the membrane being subjected to unacceptably high levels of fouling, for example, by biological matter or suspended particles.

Preferably, the second solution is an aqueous solution of at least one salt. The salt may be selected from one or more of sodium chloride, potassium chloride, magnesium sulfate ($MgSO_4.6H_2O$ or $MgSO_4.7H_2O$), magnesium chloride ($MgCl_2.6H_2O$), sodium sulfate ($Na_2SO_4.10H_2O$), calcium chloride ($CaCl_2.2H_2O$ or $CaCl_2.6H_2O$), disodium hydrogenphosphate ($Na_2HPO_4.12H_2O$) and potassium alum ($24H_2O$). Alternatively, the second solution is an aqueous solution of sugar, such as glucose, fructose and/or sucrose. The sugar may be derived from any suitable source. For example, beet sugar and/or cane sugar may be employed.

In a preferred embodiment, a saline solution (e.g. seawater or brackish water) is used as the first solution and is placed on one side of the membrane. A second solution having a higher solute concentration than the solute concentration of the saline solution is placed on the other side of the membrane. Preferably, an aqueous solution of sodium chloride (NaCl), potassium chloride (KCl), magnesium sulfate ($MgSO_4.6H_2O$ or $MgSO_4.7H_2O$), magnesium chloride ($MgCl_2.6H_2O$), sodium sulfate ($Na_2SO_4.10H_2O$), calcium chloride ($CaCl_2.2H_2O$ or $CaCl_2.6H_2O$), disodium hydrogenphosphate ($Na_2HPO_4.12H_2O$) and potassium alum ($24H_2O$) and/or a sugar, such as glucose, fructose and/or sucrose is employed as the second solution.

The second solution may contain chemical additives such as anti-scaling agents, corrosion inhibitors, anti-fouling agents and disinfectants. The additives may be contained in the system and reused, for example, when the second solution is circulated in a continuous loop.

The difference in osmotic potential on either side of the membrane causes water from the saline solution (e.g. seawater or brackish water) to pass into the second solution by osmosis. As the flow of water occurs along the concentration gradient, high pressures are not required to induce flow. However, a pressure differential across the membrane may be used, if desired.

Although the dissolved species in the first solution may be sufficiently small to pass through the pores of the membrane, they are prevented from doing so because of the high osmotic potential on the other side of the membrane.

The initial membrane separation step may be carried out in the absence of an applied pressure. Thus, although fouling of the membrane may occur, for example, by biological matter (e.g. seaweed, algae, bacteria, fungi and plankton) and suspended particles (e.g. dirt, soil, mud, silt, organic colloids, silica, precipitates and sand particles) in the saline solution (e.g. seawater or brackish water), the membrane may be cleaned or replaced without interrupting an expensive stage of the process. Moreover, as this separation step may be carried out without pressurization, there is no need to re-pressurize the membrane when re-starting the process.

The flow of water from the saline solution dilutes the second solution. Water is then extracted from the diluted second solution. Suitable extraction techniques include the distillation and membrane methods described above. As described above, a combination of two or more of these extraction techniques may be used.

In one embodiment, reverse osmosis is employed. In reverse osmosis, the second solution may be placed on one side of a semi-permeable membrane, and subjected to a high pressure.

The other side of the membrane is maintained at a lower pressure. The resulting pressure differential causes solvent (e.g. water) to flow across the membrane, leaving behind a residual solution on the pressurized side of the membrane.

Any selectively membrane may be employed in the reverse osmosis step. For example, conventional semi-permeable membranes and nanofiltration membranes may be employed.

The pressure differential employed in reverse osmosis may be about 0.1 to 20 MPa, preferably, about 0.5 to 15 MPa, more preferably, about 0.7 to 7 MPa, and most preferably, about 1 to 3 MPa. One side of the membrane may be pressurized, whilst the other side may be maintained at atmospheric or a sub-atmospheric pressure. Preferably, only one side of the membrane is pressurized. The pressurized side of the membrane may be subjected to a pressure of about 0.1 to 20 MPa, preferably, about 0.5 to 15 MPa, more preferably, about 0.7 to 7 MPa, and most preferably, about 1 to 3 MPa. It should be understood that the precise pressure required would vary depending, for example, on the relative solute concentrations of the solutions on either side of the membrane.

As explained above, the second solution may contain a lower concentration of components that cause membrane fouling (e.g. biological matter and suspended particles) than the first solution. The second solution may also contain chemical additives such as anti-scaling agents, corrosion inhibitors, anti-fouling agents and disinfectants. In such embodiments, the pressure required to extract solvent from the diluted second solution by reverse osmosis is generally less than the pressure required to extract solvent from the first solution by reverse osmosis using first solution directly. For example, pressures of 5 to 8 MPa are required to desalinate seawater directly by reverse osmosis.

The process of the present invention may be continuous or a batch process.

The flow of solvent across a membrane is generally influenced by thermal conditions. Thus, the solutions on either side of the membrane may be heated or cooled, if desired. The solutions may be heated to temperatures of 30 to 100° C., for example, 40 to 80° C. Alternatively, the solutions may be cooled to −20 to 20° C., for example, 7 to 12° C. The solution on one side of the membrane may be heated, while the other side cooled. The heating or cooling may be carried out on each solution independently. Chemical reactions may also be carried out on either side of the membrane, if desired.

The process of the present invention may further comprise a pre-treatment step of removing contaminants, such as suspended particles and biological matter, from the first solution (e.g. a waste stream, seawater or brackish water). Additionally or alternatively, a threshold inhibitor to control scaling may be added to the first solution. Pre-treatment steps to alter the pH of the first solution may also be employed. Where seawater is used as the first solution, deep seawater is preferably employed as generally contains fewer suspended particles and less biological matter than seawater obtained from the surface of the ocean.

The process of extracting solvent from the first solution may optionally be carried out at surface of the ocean or by the coast.

The osmotic potential of the second solution may be enhanced by microwave, laser electromagnetic, electric fields (electro osmosis) and electrokinetic treatment.

The processes of the first and second aspect of the present invention may be used to concentrate the first solution. For example, the first solution may be concentrated into a form that is more convenient for disposal (reduced volume). This may be useful if the first solution is a waste stream.

Figure 2:
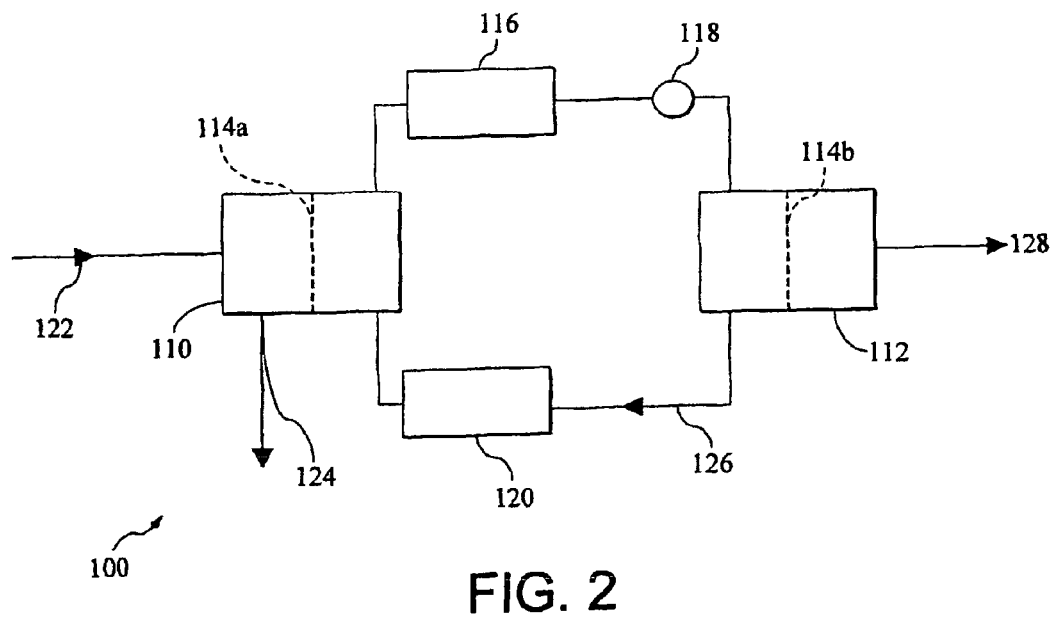
Figure 3:
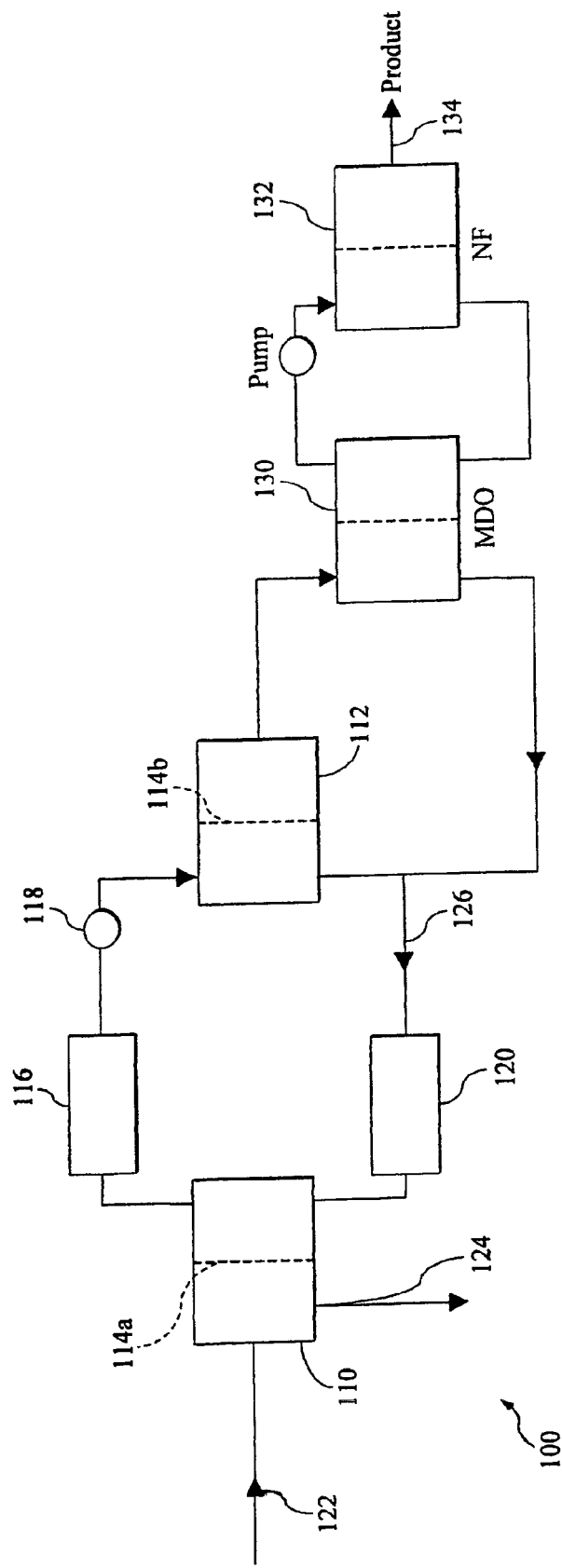
Figure 4:
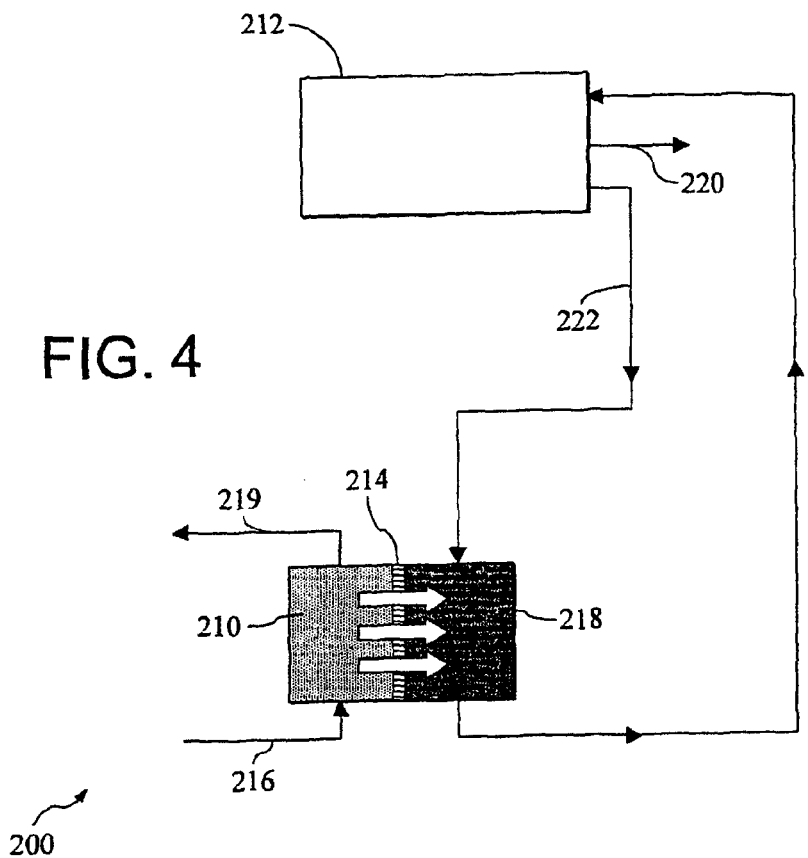
Figure 5:
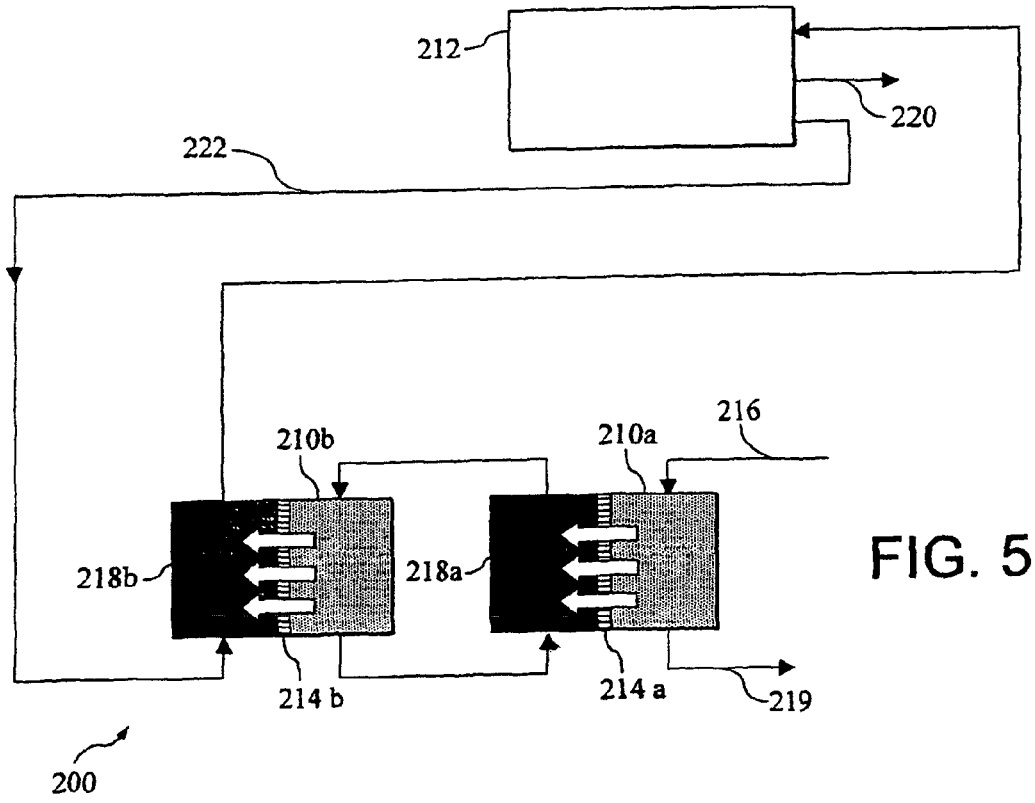
Figure 6:
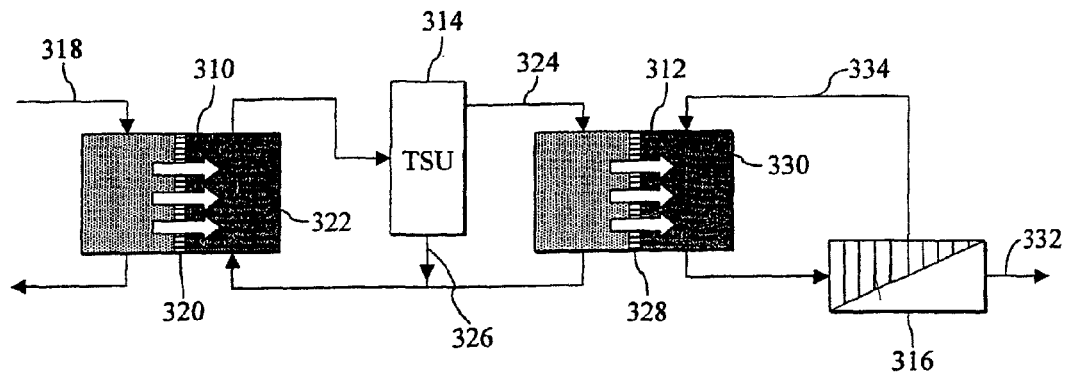
Figure 7:
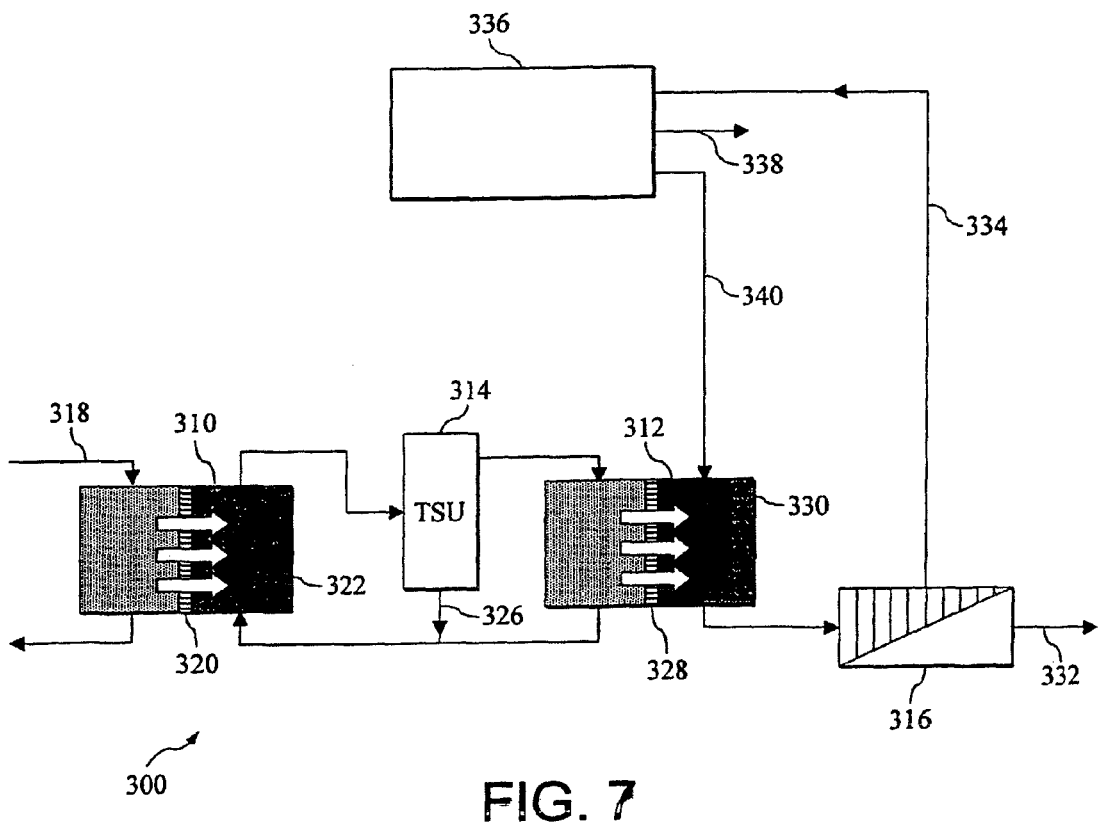
Figure 8:
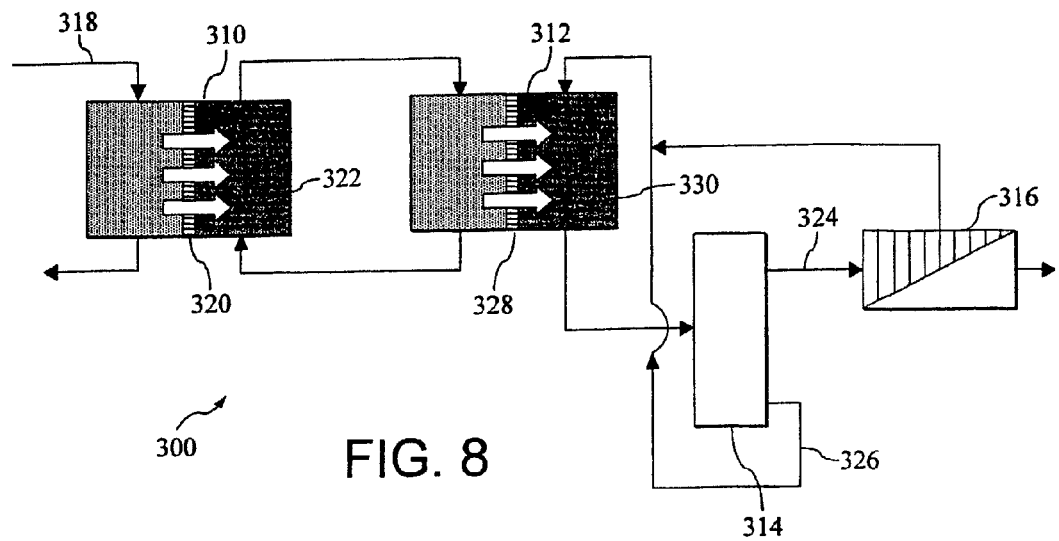
Figure 9:
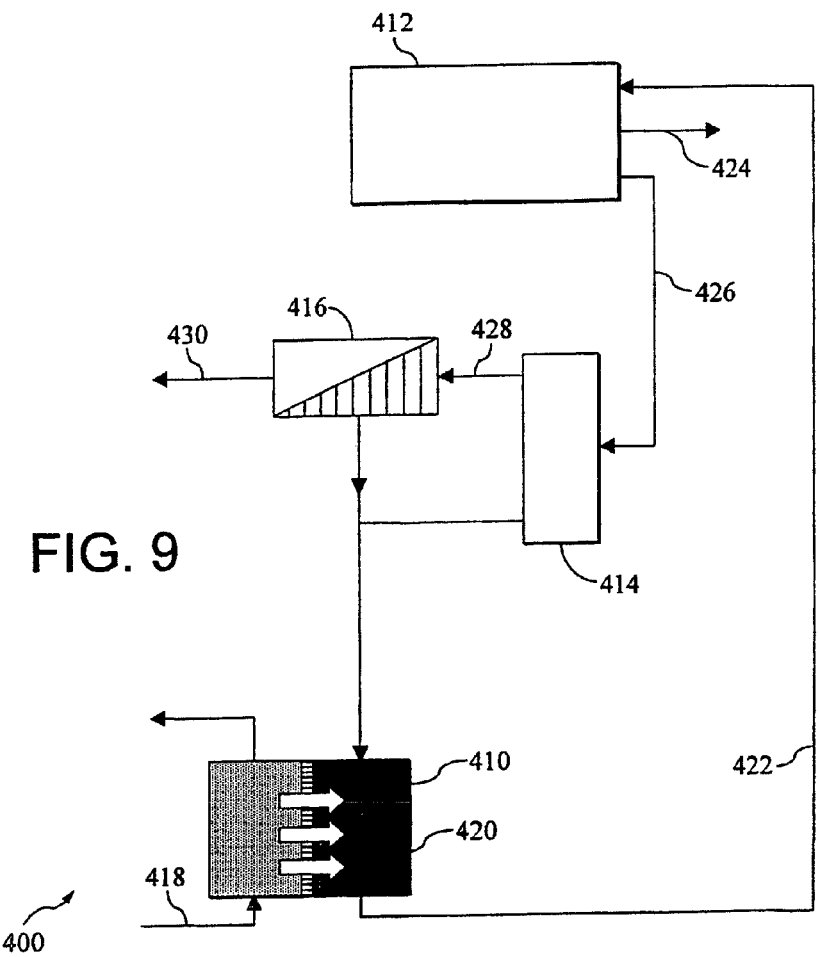
Figure 10:
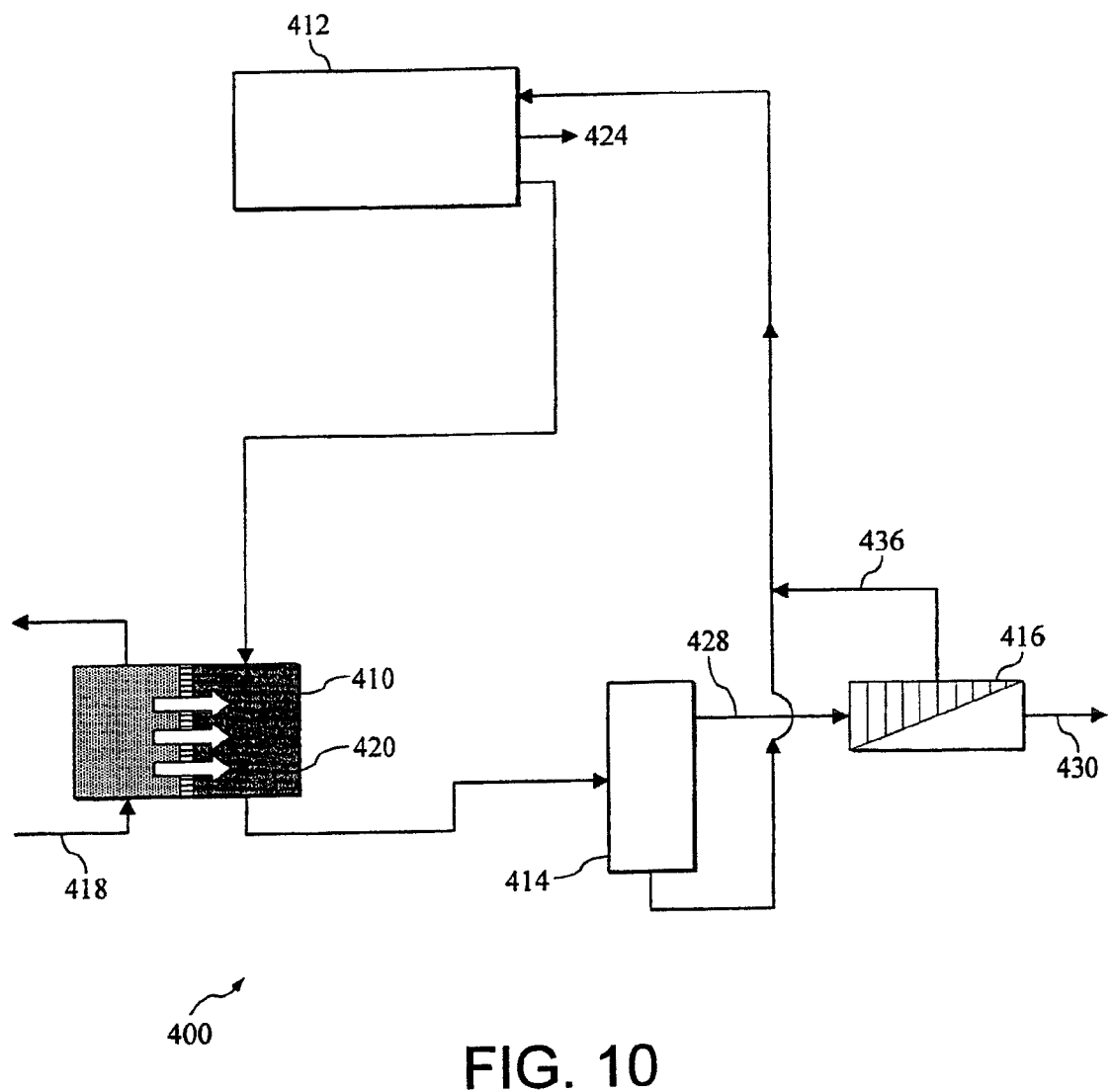

Preferred embodiments of the process of the present invention will now be described, by way of example, with reference to the accompanying drawings, in which:

FIG. 1 is a schematic flow diagram of an apparatus for desalinating seawater by a conventional reverse osmosis process, FIG. 2 is a schematic flow diagram of an apparatus for desalinating seawater using a process according to a first embodiment of the present invention, FIG. 3 is a schematic flow diagram of an apparatus for desalinating seawater using a process according to a second embodiment of the present invention, FIG. 4 is a schematic flow diagram of an apparatus for desalinating seawater using a process according to a third embodiment of the present invention, FIG. 5 is a schematic flow diagram of an apparatus for desalinating seawater using a process according to a fourth embodiment of the present invention, FIG. 6 is a schematic flow diagram of an apparatus for desalinating seawater using a process according to a fifth embodiment of the present invention, FIG. 7 is a schematic flow diagram of an apparatus for desalinating seawater using a process according to a sixth embodiment of the present invention, FIG. 8 is a schematic flow diagram of an apparatus for desalinating seawater using a process according to a seventh embodiment of the present invention, FIG. 9 is a schematic flow diagram of an apparatus for desalinating seawater using a process according to an eighth embodiment of the present invention, and FIG. 10 is a schematic flow diagram of an apparatus for desalinating seawater using a process according to a ninth embodiment of the present invention.

Reference is first made to FIG. 1 of the drawings. This Figure depicts an apparatus 10 for performing a conventional desalination process by reverse osmosis. The apparatus 10 comprises a high-pressure pump 12 and a membrane module 14. The module 14 contains a semi-permeable membrane 16.

In use, seawater is pumped into the module 14 using the high-pressure pump 12. This causes the seawater to come into contact with the one side of the semi-permeable membrane 16 at high pressure. Typically, pressures of 5 to 8 MPa are employed. As a result, water flows through the membrane 16, leaving a concentrated seawater solution on the pressurized side of the membrane 16. The concentrated seawater solution may be removed and discarded via line 18.

The water collected on the unpressurized side of the membrane 16 is substantially pure, and is removed from the module 14 via line 20.

After a period of use, the semi-permeable membrane 16 becomes clogged by deposits and suspended particles in the seawater. Thus, the reverse osmosis step has to be stopped about every two to four months to clean and/or replace the membrane 16.

Reference is now made to FIG. 2 of the drawings, which depicts an apparatus for desalinating seawater using a process according to a first embodiment of the present invention.

The apparatus 100 comprises a first membrane module 110 and a second membrane module 112. Each of the modules 110, 112 contains a membrane 114a, 114b. The first membrane 114a is an ion-selective membrane having an average pore size of 10 Angstroms. The second membrane 114b is a nanofiltration membrane.

The first membrane module 110 is coupled to a storage tank 116. The storage tank 116 is coupled to the second membrane module 112 via a pump 118. The apparatus 100 also comprises a mixing tank 120 for producing a solution of magnesium sulfate.

A magnesium sulfate solution is formed in mixing tank 120 by dissolving a known quantity of magnesium sulfate in water. The resulting solution has a magnesium sulfate concentration that is higher than the total dissolved salt (TDS) concentration of the seawater under treatment.

Seawater is introduced to one side of the membrane 114a of the first membrane module 110 via line 122. The magnesium sulfate solution is introduced to the other side of the membrane 114a. As the magnesium sulfate solution has a solute concentration that is higher than the total dissolved salt (TDS) concentration of seawater, water flows across the membrane 114a by direct osmosis. The flow of water dilutes the magnesium sulfate solution, leaving behind a salty residual solution on the seawater side of the membrane 114a. The latter may be removed via line 124.

Magnesium and sulfate ions are too large to pass through the pores of the membrane 114a. Thus, there is no back flow of solute from the magnesium sulfate solution into the seawater.

The diluted magnesium sulfate solution is recovered from the first membrane module 110 and transferred to the storage tank 116. The diluted magnesium sulfate solution is then transferred to the second membrane module 112 using the pump 118.

In the second membrane module 112, the diluted magnesium sulfate solution is introduced into the membrane module 112 where it is contacted with one side of a nanofiltration membrane 114b. The magnesium and sulfate ions in the diluted magnesium sulfate solution are too large to pass through the pores of the membrane 114b and are retained on the membrane as a residue. This residue can be recycled to storage tank 120 via line 126.

Water from the magnesium sulfate solution, on the other hand, passes through the nanofiltration membrane 114b and this is recovered via line 128.

Reference is now made to FIG. 3 of the drawings, which depicts an apparatus for desalinating seawater using a process according to a second embodiment of the present invention. The embodiment of FIG. 3 is similar to that of FIG. 2 and like numerals have been used to illustrate like parts. The apparatus of FIG. 3, however, further includes third and fourth membrane modules 130, 132.

A solution of magnesium sulfate and sodium chloride is formed in mixing tank 120. The total dissolved salt (TDS) concentration of the resulting solution is higher than the TDS of the seawater under treatment.

Seawater is introduced to one side of the membrane 114a of the first membrane module 110 via line 122. The magnesium sulfate/sodium chloride solution is introduced to the other side of the membrane 114a. As the magnesium sulfate/sodium chloride solution has a solute concentration that is higher than the total dissolved salt (TDS) concentration of seawater, water flows across the membrane 114a by direct osmosis. The flow of water dilutes the magnesium sulfate/sodium chloride solution, leaving behind a salty residual solution on the seawater side of the membrane 114a. The latter may be removed via line 124.

The diluted magnesium sulfate/sodium chloride solution is recovered from the first membrane module 110 and transferred to the second membrane module 112 using the pump 118.

In the second membrane module 112, the diluted magnesium sulfate/sodium chloride solution is passed through a nanofiltration membrane 114b. As magnesium and sulfate ions are too large to pass through the pores of the membrane, these retained by the nanofiltration membrane 114b as a residue. This residue is recycled to mixing tank 120 via line 126. Sodium and chloride ions, on the other hand, are sufficiently small to pass through the pores of the nanofiltration membrane 114b. Thus, sodium chloride solution is collected as a filtrate, which is transferred to the third membrane module 130 for further treatment.

In the third membrane module 130, the sodium chloride solution is contacted with one side of a semi-permeable membrane. A magnesium sulfate solution having a higher total dissolved salts concentration is contacted with the other side of the membrane. As a result of the difference in osmotic pressure across the membrane, water flows across the membrane to dilute the magnesium sulfate solution. The sodium chloride solution on the other side of the membrane becomes increasingly concentrated and is recycled to the storage tank 120.

The diluted magnesium sulfate solution is retrieved from the third membrane module and introduced into the fourth membrane module 132. In the fourth membrane module, the diluted magnesium sulfate solution is passed through a nanofiltration membrane. As magnesium and sulfate ions are too large to pass through the membrane, they are retained by the nanofiltration membrane as a residue. This residue may be recycled to the third membrane module 130.

The diluted magnesium sulfate solution introduced into the fourth membrane module 132 may be at an elevated pressure, due to the influx of water from the sodium chloride solution This elevated pressure may help to push the magnesium sulfate solution across the nanofiltration membrane in the fourth membrane module 132. Alternatively or additionally, a pump may be used to aid the passage of liquid through the membrane.

The water that passes through the nanofiltration module is substantially pure and this may be removed via line 134.

Reference is now made to FIG. 4 of the drawings, which depicts an apparatus for desalinating seawater using a process according to a third embodiment of the present invention.

The apparatus 200 comprises a membrane module 210 and a multi-stage flash distillation unit 212. The membrane module 210 contains a conventional semi-permeable membrane 214.

Seawater 216 is introduced to one side of the membrane 214. The other side of the membrane 214 is in contact with a solution of magnesium sulfate 218 having a higher total dissolved salts concentration than seawater 216. The difference in osmotic potential causes water to flow across the membrane 214 by direct osmosis. The flow of water dilutes the magnesium sulfate solution, leaving behind a salty residual solution on the seawater side of the membrane 214. The residual solution may be removed via line 219 and, optionally, returned to the sea.

The diluted magnesium sulfate solution is recovered from the module 210 and transferred to the multi-stage flash distillation unit 212. In the multi-stage flash distillation unit 212, the second solution is heated and introduced into an evaporation chamber, where it is subjected to a pressure below its vapour pressure. The sudden reduction in pressure causes boiling or flashing to occur. The flashed vapours may be condensed and separated from the remainder of the solution via line 220. The remaining solution is recycled to the module 210 via line 222. A series of evaporation chambers are employed so that the flashing or evaporation step occurs in multiple stages.

FIG. 5 depicts an apparatus for desalinating seawater using a process according to a fourth embodiment of the present invention. The apparatus of FIG. 5 is similar to the apparatus of FIG. 4. Thus, like numerals have been used to designate like parts. Unlike the apparatus of FIG. 4, however, the apparatus of FIG. 5 comprises two modules 210a and 210b are used in series.

The first module 210a comprises a semi-permeable membrane 214a for separating seawater 216 from a solution 218a formed by dissolving a known amount of magnesium sulfate in water. The second module 210b comprises a semi-permeable membrane 214b for separating solution 218a from the first module 210a from a solution 218b formed by dissolving a known amount of magnesium sulfate in water.

In use, seawater 216 is circulated through the module 210a on one side of the membrane 214a, whilst magnesium sulfate solution 218a is circulated through the module 214a on the opposite side of the membrane 214a. The magnesium sulfate solution in contact with the membrane 214a has a higher total dissolved salt (solute) concentration than the seawater 216. Thus, water flows from the seawater-side of the membrane 214a to the solution-side of the membrane 214a by osmosis.

The flow of water across the membrane 214a dilutes the magnesium sulfate solution 218a. The diluted solution 218a is circulated through the module 210b on one side of the membrane 214b, whilst magnesium sulfate solution 218b is circulated through the module 210b on the opposite side of the membrane 214b. The solution 218b in contact with the membrane 214b has a higher total dissolved salt (solute) concentration than the solution 218a in contact with the membrane 214b. Thus, water flows across the membrane 214b by osmosis to dilute the magnesium sulfate solution 218b. The diluted solution 218b is introduced into multi-stage flash distillation unit 212 in the manner described with reference to FIG. 4.

As water flows across the membrane 214b by osmosis, the magnesium sulfate solution 218a becomes increasingly concentrated and this is recirculated to the first module 210a.

FIG. 6 depicts an apparatus for desalinating seawater using a process according to a fifth embodiment of the present invention.

The apparatus 300 comprises two membrane module 310, 312, a thermal separation unit 314 and a nanofiltration unit 316.

In use, seawater 318 is circulated through the first module 310 on one side of the selectively permeable membrane 320, whilst magnesium sulfate solution 322 is circulated through the module 310 on the opposite side of the membrane 320. The magnesium sulfate solution in contact with the membrane 320 has a higher total dissolved salt (solute) concentration than the seawater 318. Thus, water flows from the seawater-side of the membrane to the solution-side of the membrane by osmosis.

The diluted magnesium sulfate solution is withdrawn from the module 310 and introduced into the thermal separation unit 314. In the thermal separation unit 314, the solution is cooled such that some of the dissolved solute precipitates out of solution at the base of the unit. The remainder of the solution has a reduced solute concentration and is introduced into the second membrane module 314 via line 324. The solution 326 withdrawn from the base of the unit 314 has an increased solute concentration. This solution 326 is reused to extract water from seawater in the membrane module 310.

In the second membrane module 312, the solution withdrawn via line 324 is contacted with semi-permeable membrane 328. A magnesium sulfate solution 330 having a higher total dissolved salts concentration than the solution withdrawn via line 324 is contacted with the opposite side of the membrane. The difference in osmotic pressure on either side of the membrane 328 causes water to flow across the membrane 328 to dilute the magnesium sulfate solution 330.

The diluted magnesium sulfate solution 330 is withdrawn and introduced into the nanofiltration unit 316. The nanofiltration membrane in the unit 316 is used to separate solute components from the diluted magnesium sulfate solution. A portion 332 of the filtrate 332 is recovered, whilst the remainder 334 is returned to the second module 312.

The diluted solutions withdrawn from membrane modules 310, 312 may be at an elevated pressure, even when a pressure is not applied to induce the flow of water across the membrane 320, 328. This is because the flow of water occurs along a concentration gradient. This pressure may be used to aid the subsequent extraction of water from the diluted solution. For example, the excess pressure may be used to drive the solution through the membrane in the nanofiltration unit 316.

The magnesium sulfate solution 322 circulated through the first membrane module 310 may optionally be replaced with disodium hydrogen phosphate, $(Na_2HPO_4.12H_2O)$. The solubility of sodium phosphate is more sensitive to temperature variation than magnesium sulfate. This may enhance the efficiency of the thermal separation unit 314.

The apparatus of FIG. 7 is similar to the apparatus of FIG. 6. Thus, like numerals have been used to designate like parts. Unlike the apparatus of FIG. 6, however, the apparatus of FIG. 7 further comprises a multi-stage flash distillation unit 336.

In use, a portion 332 of the filtrate from the nanofiltration unit 316 is recovered, whilst the remainder 334 of the filtrate is introduced into the multi-flash distillation unit 336. In the multi-flash distillation unit 336, water is separated from the filtrate 334 as a vapour, which is condensed and recovered via line 338. Residual solution 340 from the multi-stage flash distillation is returned to the second module 312.

The apparatus of FIG. 8 is similar to the apparatus of FIG. 6. Thus, like numerals have been used to designate like parts. In use, however, the diluted magnesium sulfate solution 322 from the first membrane module 310 is introduced directly into the second membrane module 312 rather than the thermal separation unit 314.

In the second membrane module 312, the diluted magnesium sulfate solution 322 is contacted with a semi-permeable membrane 328. A further magnesium sulfate solution 330 having a higher total dissolved salts concentration than the solution 322 is contacted with the opposite side of the membrane 328. The difference in osmotic pressure causes water to flow across the membrane 328 to dilute the further magnesium sulfate solution 330.

The diluted solution 330 from the second module 312 is introduced into the thermal separation unit 314. In the thermal separation unit 314, the solution is cooled such that dissolved solutes in the solution precipitate at the base of the unit 314. The remainder of the solution has a reduced solute concentration and is withdrawn from the top of the unit via line 324. This stream is introduced into the nanofiltration unit 316, where it is filtered to produce a filtered water stream. A portion 332 of the water stream is recovered, whilst the remainder is recycled to the second module 312 via line 334.

The solution 326 from the base of the thermal separation unit 314 has an increased solute concentration and is reused to extract water from seawater in the second membrane module 312.

In the apparatus 400 of FIG. 9, there is provided a membrane module 410, a multi-stage flash distillation unit 412, a nanofiltration unit 416 and a thermal separation unit 414.

In use, seawater 418 is circulated through the first module 410 on one side of a selectively permeable membrane, whilst magnesium sulfate solution 420 is circulated through the module 410 on the opposite side of the membrane. The magnesium sulfate solution 420 in contact with the membrane has a higher total dissolved salt (solute) concentration than the seawater 418. Thus, water flows from the seawater-side of the membrane to the solution-side of the membrane by osmosis.

A portion 422 of the diluted magnesium sulfate solution 420 is introduced into the multi-stage flash distillation unit 412. In unit 412, vapour extracted from the solution is condensed as a pure water stream 424. The residual solution 426 emerging the unit 412 is introduced into the thermal separation unit 414. In the thermal separation unit 414, the solution 426 is cooled such that at least some of the dissolved solutes in the solution precipitate out of solution at the base of the unit 414. The remainder 428 of the solution has a reduced solute concentration and is filtered in the nanofiltration unit 416 to provide a pure water stream 430. The solution from the base of the thermal separation unit 414 is withdrawn and returned to the membrane module 410.

The apparatus of FIG. 10 is similar to the apparatus of FIG. 9 and like numerals have been used to designate like parts.

In use, the solution 420 is withdrawn from the membrane module 410 and introduced into the thermal separation unit 414. In the thermal separation unit 414, the solution 420 is cooled such that the dissolved solutes precipitate from the solution at the base of the unit 414. The remainder of the solution has a reduced solute concentration. This solution 428 is withdrawn from the unit 414 and introduced into the nanofiltration unit 416. The solution at the base of the unit has a higher solute concentration and is introduced into the multi-stage flash distillation unit 412.

In the nanofiltration unit 416, the solution 428 is passed through a nanofiltration membrane (not shown) that separates water from the solution 428. A portion of the water is extracted via line 430, whilst the remainder is removed via line 436 for further purification by multi-stage flash distillation.

In the multi-stage flash distillation unit 412, water is extracted from the solution 434 as a vapour, which is condensed as a pure water stream 424. The residual solution 426 from the multi-stage flash distillation unit is recycled to the membrane module 410.

The invention claimed is:

1. A process for removing water from a first solution, said process comprising:
   i) providing a first solution comprising seawater, brackish water or waste water;
   ii) forming a second solution having a higher osmotic potential than the first solution by dissolving a water soluble solute in water, the second solution substantially free of components that cause membrane fouling or scaling;
   iii) directly adding into the second solution an additive selected from the group consisting of an anti-scaling agent, an anti-fouling agent, and combinations thereof;
   a) positioning a first membrane between the first solution and the second solution, such that water from the first solution passes across the first membrane to dilute the second solution by direct osmosis, and
   b) passing the diluted second solution through a second membrane, wherein the second solution contains solute species too large to pass through the pores of the first selective membrane and the second membrane.

2. The process of claim 1 comprising extracting water from the diluted second solution.

3. The process of claim 1 wherein the second solution comprises a water soluble salt.

4. The process of claim 1 comprising forming a second solution comprising a cationic species of Groups I to III.

5. The process of claim 1 wherein the passing (iii) (b) comprises passing the diluted second solution through a second membrane that is a reverse osmosis membrane.

6. The process of claim 1 wherein the forming (ii) comprises forming a second solution comprising a cation selected from the group consisting of ammonium and a Group I to III metal ion and an anion selected from the group consisting of chloride, bromide, iodide, sulphate, sulphite, sulphide, carbonate, hydrogen carbonate, nitrate, nitrite, nitride, phosphate, hydrogen phosphate, aluminate, borates, bromate, carbide, chloride, perchlorate, hypochlorate, chromate, fluorosilicate, fluorosulphate, silicate, cyanide and cyanate.

7. The process of claim 1 wherein the forming (ii) comprises forming a second solution with a water soluble solute selected from the group consisting of $MgSO_4.6H_2O$, $MgSO_4.7H_2O$, $MgCl_2.6H_2O$, $Na_2SO_4.10H_2O$, $CaCl_2.2H_2O$, $CaCl_2.6H_2O$, potassium alum.$24H_2O$, potassium chloride, sodium chloride, and $Na_2HPO_4.12H_2O$ in water.

8. A process for removing water from a first solution, said process comprising:
   positioning a first selective membrane between
   (i) a first solution comprising seawater, brackish water, or waste water and
   (ii) a second solution with a higher osmotic potential than the first solution, the second solution comprising a water soluble solute, the second solution substantially free of components that cause membrane fouling;
   passing water, by way of direct osmosis, through the first selective membrane, from the first solution to the second solution to form a diluted second solution;
   adding, directly into the second solution, an anti-scaling agent;
   circulating a portion of the second solution in a continuous loop; and
   passing the diluted second solution through a second membrane.

9. The process of claim 8 comprising extracting water from the diluted second solution.

10. The process of claim 8 comprising forming the second solution (ii) comprising a cationic species of Groups I to III.

11. The process of claim 8 comprising forming the second solution (ii) comprising sodium chloride.

12. The process of claim 8 comprising passing the diluted second solution through a second membrane that is a reverse osmosis membrane.

13. The process of claim 8 wherein the circulating comprises removing a residue from the second membrane; and recycling the residue to a storage tank.

14. A process for removing water from a first solution, said process comprising:
   positioning a first selective membrane between
   (i) a first solution comprising seawater, brackish water, or waste water and
   (ii) a second solution with a higher osmotic potential than the first solution, the second solution comprising a water soluble solute selected from the group consisting of $MgSO_4.6H_2O$, $MgSO_4.7H_2O$, $MgCl_2.6H_2O$, $Na_2SO_4.10H_2O$, $CaCl_2.2H_2O$, $CaCl_2.6H_2O$, potassium alum.$24H_2O$, potassium chloride, sodium chloride, and $Na_2HPO_4.12H_2O$ in water;

passing water, by way of direct osmosis, through the first selective membrane, from the first solution to the second solution to form a diluted second solution;

adding, directly into the second solution, an anti-scaling agent;

circulating a portion of the second solution in a continuous loop; and passing the diluted second solution through a second membrane.

15. A process for removing water from a first solution, said process comprising:
positioning a first selective membrane between
  (i) a first solution comprising seawater, brackish water, or waste water and
  (ii) a second solution with a higher osmotic potential than the first solution, the second solution comprising a water soluble salt, the second solution substantially free of components that cause membrane fouling;

passing water, by way of direct osmosis, through the first selective membrane, from the first solution to the second solution to form a diluted second solution;

adding, directly into the second solution, an anti-scaling agent;

circulating a portion of the second solution in a continuous loop;

passing the diluted second solution through a second membrane; and extracting water from the diluted second solution.

16. The process of claim 15 comprising forming the second solution (ii) comprising sodium chloride.

17. The process of claim 15 comprising passing the diluted second solution through a second membrane that is a reverse osmosis membrane.

* * * * *